United States Patent
Ozaki

(10) Patent No.: US 10,742,932 B2
(45) Date of Patent: *Aug. 11, 2020

(54) COMMUNICATION TERMINAL, COMMUNICATION SYSTEM, MOVING-IMAGE OUTPUTTING METHOD, AND RECORDING MEDIUM STORING PROGRAM

(71) Applicant: Ricoh Company, Ltd., Tokyo (JP)

(72) Inventor: Hiroki Ozaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,645

(22) Filed: Jul. 5, 2019

(65) Prior Publication Data

US 2019/0335140 A1    Oct. 31, 2019

Related U.S. Application Data

(63) Continuation of application No. 15/825,186, filed on Nov. 29, 2017, now Pat. No. 10,389,975.

(30) Foreign Application Priority Data

Dec. 2, 2016 (JP) ................................. 2016-234903

(51) Int. Cl.
  *H04N 7/14* (2006.01)
  *H04N 7/15* (2006.01)
  *G06F 3/0482* (2013.01)
  *H04L 29/06* (2006.01)
  *G06F 3/0488* (2013.01)

(52) U.S. Cl.
  CPC ............. *H04N 7/15* (2013.01); *G06F 3/0482* (2013.01); *G06F 3/04883* (2013.01); *H04L 65/1069* (2013.01); *H04L 65/403* (2013.01); *H04N 7/147* (2013.01)

(58) Field of Classification Search
  CPC .......... H04N 7/147; H04N 7/15; H04N 7/142; H04N 7/152; H04N 7/157; H04N 21/4223; H04N 7/148; H04N 2007/145; H04N 7/155
  See application file for complete search history.

(56) References Cited

U.S. PATENT DOCUMENTS

| 10,389,975 B2 * | 8/2019 | Ozaki ................ G06F 3/04883 |
| 2009/0210789 A1 | 8/2009 | Thakkar et al. |
| 2014/0376878 A1 | 12/2014 | Nakamura et al. |
| 2015/0077511 A1 | 3/2015 | Mihara et al. |

(Continued)

Primary Examiner — Quoc D Tran
(74) Attorney, Agent, or Firm — Xsensus LLP

(57) ABSTRACT

A communication terminal comprising circuitry, a method of outputting moving images, and a computer-readable non-transitory recording medium storing a program for causing a computer to execute the method. The communication terminal and the method includes receiving an event related to an initiation of communication with a counterpart communication terminal, inputting moving images output by an external device, and outputting the moving images input by the inputting to a display. After the receiving receives the event related to the initiation of communication, the outputting includes reducing a frame rate of the moving images to be output to the display.

20 Claims, 17 Drawing Sheets

(56) References Cited

U.S. PATENT DOCUMENTS

| | | |
|---|---|---|
| 2016/0080788 A1 | 3/2016 | Ozaki et al. |
| 2016/0241891 A1 | 8/2016 | Ninomiya et al. |
| 2017/0094368 A1 | 3/2017 | Kakei |
| 2017/0279862 A1 | 9/2017 | Bader-Natal et al. |

\* cited by examiner

FIG. 14

| STROKE DATA ID | START TIME | END TIME | COLOR | WIDTH | COORDINATE ARRANGEMENT DATA ID |
|---|---|---|---|---|---|
| s001 | 20150522152202 | 20150522152205 | ff0000 | 2 | c001 |
| s002 | 20150522152612 | 20150522152615 | 000ff0 | 3 | c002 |
| s003 | 20150522152704 | 20150522152712 | ff0000 | 1 | c003 |
| ... | ... | ... | ... | ... | ... | st001

| COORDINATE ARRANGEMENT DATA ID |
|---|
| ... |
| ... |
| ... |
| ... | st002

| COORDINATE ARRANGEMENT DATA ID |
|---|
| ... |
| ... |
| ... |
| ... | st003

FIG. 15

| X COORDINATE VALUE | Y COORDINATE VALUE | DIFFERENCE IN TIME | WRITING PRESSURE c001 | WRITING PRESSURE c002 | WRITING PRESSURE c003 |
|---|---|---|---|---|---|
| 10 | 10 | 100 | 255 | ... | ... |
| 12 | 10 | 200 | 255 | ... | ... |
| 14 | 12 | 300 | 255 | ... | ... |
| ... | ... | ... | ... | ... | ... |

COMMUNICATION TERMINAL, COMMUNICATION SYSTEM, MOVING-IMAGE OUTPUTTING METHOD, AND RECORDING MEDIUM STORING PROGRAM

CROSS-REFERENCE TO RELATED APPLICATIONS

This patent application is a continuation of U.S. patent application Ser. No. 15/825,186, filed Nov. 29, 2017, which based on and claims priority pursuant to 35 U.S.C. § 119(a) to Japanese Patent Application No. 2016-234903, filed on Dec. 2, 2016, in the Japan Patent Office, the entire contents of each are incorporated herein by reference.

BACKGROUND

Technical Field

Embodiments of the present disclosure relate to a communication terminal, a communication system, a moving-image outputting method, and a recording medium storing a program.

Background Art

With the need for reducing costs or times associated with business trips in recent years, communication systems are widely used, which are capable of carrying out videoconferences among a plurality of communication terminals at remotely located sites through a communication network such as the Internet or private lines. As the communication terminals, for example, electronic whiteboards that transmit stroke data such as of a drawn text, or video conference terminals that transmit video data such as of a conference participant are known in the art. Moreover, multiple applications with various functions are executed in the same communication terminal. Due to such a configuration, diversified communication is achieved such as sharing other contents of data with an external communication terminal while outputting the moving images that are input from an external device.

SUMMARY

Embodiments of the present disclosure described herein provide a communication terminal comprising circuitry, a method of outputting moving images, and a computer-readable non-transitory recording medium storing a program for causing a computer to execute the method. The communication terminal and the method includes receiving an event related to an initiation of communication with a counterpart communication terminal, inputting moving images output by an external device, and outputting the moving images input by the inputting to a display. After the receiving receives the event related to the initiation of communication, the outputting includes reducing a frame rate of the moving images to be output to the display.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 14 is a diagram illustrating stroke arrangement data, according to an embodiment of the present disclosure.

FIG. 15 is a diagram illustrating an example data structure of the coordinate arrangement data, according to an embodiment of the present disclosure.

Figure 1:
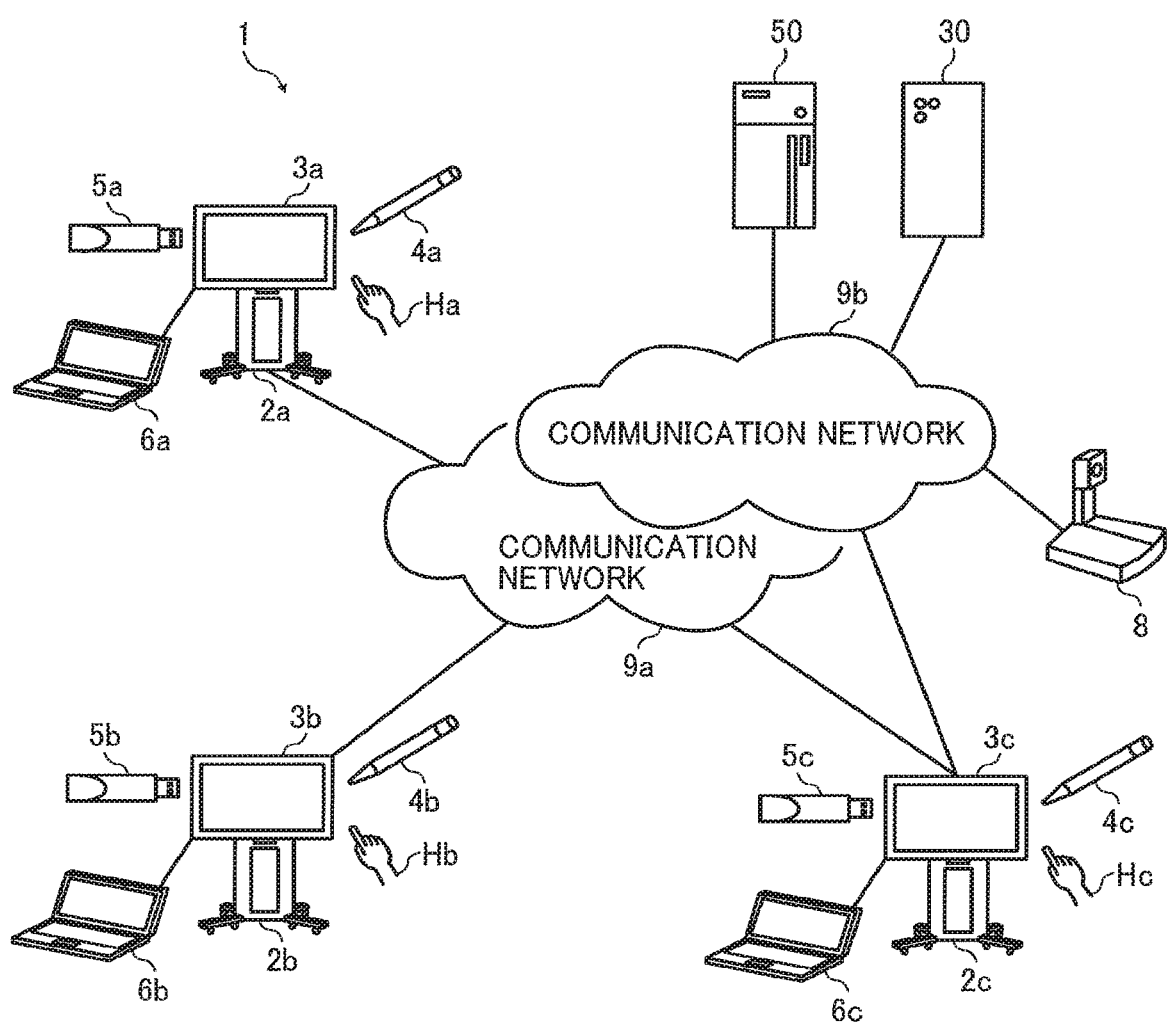
FIG. 1 is a diagram illustrating a schematic network configuration of a communication system, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, an embodiment of the present invention is described with reference to the drawings.

<<Schematic Configuration of Communication System>>

Firstly, a communication system 1 is described with reference to FIG. 1.

FIG. 1 is a diagram illustrating a schematic configuration of the communication system 1, according to an embodiment of the present disclosure.

The communication system 1 according to the present embodiment includes a plurality of electronic whiteboards 2a, 2b, and 2c, a transmission terminal 8, a relay device 30, and a management system 50.

The electronic whiteboards 2a, 2b, and 2c are connected to each other and can communicate with each other via a communication network 9a. Moreover, the electronic whiteboards 2a, 2b, and 2c are provided with displays 3a, 3b, and 3c, respectively.

The electronic whiteboards 2a, 2b, and 2c can control the displays 3a, 3b, and 3c to display images that are drawn by the events caused by electronic styluses 4a, 4b, and 4c (i.e., the touches on the displays 3a, 3b, and 3c by the tip or bottom of the electronic styluses 4a, 4b, and 4c). Note also that the electronic whiteboards 2a, 2b, and 2c can control the displays 3a, 3b, and 3c to modify the images being displayed on the displays 3a, 3b, and 3c according to the events caused not only by the electronic styluses 4a, 4b, and 4c but also by user's hands Ha, Hb, and Hc, or the like (i.e., gestures such as for zooming in, zooming out, and flipping pages). Hereinafter, any one of the electronic whiteboards 2a, 2b, and 2c may be referred to simply as the electronic whiteboard 2, and any one of the displays 3a, 3b, and 3c may be referred to simply as the display 3. Likewise, any one of the electronic styluses 4a, 4b, and 4c may be referred to simply as the electronic stylus 4, and any one of the user's hands Ha, Hb, and Hc may be referred to simply as the hand H.

To the electronic whiteboards 2a, 2b, and 2c, universal serial bus (USB) memories 5a, 5b, and 5c may be connected. The electronic whiteboards 2a, 2b, and 2c can read electronic files such as portable document format (PDF) files from the USB memories 5a, 5b, and 5c, or can store such electronic files in the USB memories 5a, 5b, and 5c. Moreover, laptop personal computers (PCs) 6a, 6b, and 6c are connected to the electronic whiteboards 2a, 2b, and 2c, respectively, through a cable that allows communication under the standard such as DisplayPort, digital visual interface (DVI), high-definition multimedia interface (HDMI, registered trademark), and video graphics array (VGA). Note also that any one of the USB memories 5a, 5b, and 5c may be referred to simply as the USB memory 5, and any one of the laptop PCs 6a, 6b, and 6c may be referred to simply as the laptop PC 6.

Due to the configuration as described above, the stroke data of a stroke that is drawn on the display 3 of the electronic whiteboard 2 at one site is transmitted to the electronic whiteboard 2 at another site through the communication network 9a, and the stroke data can also be displayed on the display 3 at the other site. In a similar manner, the stroke data that is drawn on the display 3 of the electronic whiteboard 2 at the other site is transmitted to the electronic whiteboard 2 at the one site through the communication network 9a, and the stroke data can be displayed on the display 3 of the electronic whiteboard 2 at the one site. As described above, drawing images can be shared among remote sites, such that the communication system 1 with the multiple electronic whiteboards 2 can facilitate a video conference.

Note also that any desired external communication terminal other than the electronic whiteboard 2 as above may additionally be connected to the communication network 9a to share stroke data with the electronic whiteboard 2. Such any desired external communication terminal includes a personal computer (PC) with a stroke sharing function, a video conference terminal, a tablet personal computer (PC), a smartphone, digital signage, a telestrator that is often used, for example, in sports and weather broadcasts, or a computer including, for example, an image processing device such as a remote image (video) diagnostic device, a mobile information terminal, a digital video camera, a digital camera, and a terminal such as a game machine capable of providing image frames.

The transmission terminal 8 is an example of a communication terminal for video conference capable of transmitting video data and audio data. The transmission terminal 8 may be replaced with a tablet personal computer (PC), a smartphone, digital signage, a telestrator, an image processing device, a mobile information terminal, a digital video camera, a digital camera, and a communication terminal capable of providing image frames such as a game machine. The electronic whiteboard 2c out of the electronic whiteboards 2a, 2b, and 2c is installed with a video conference application, and is capable of transmitting not only stroke data but also video data and audio data. Due to this configuration, the electronic whiteboard 2c and the transmission terminal 8 can exchange the video data and audio data for video conference through the communication network 9b.

The relay device 30 relays the video data and audio data transmitted by one of the electronic whiteboard 2c and the transmission terminal 8 to the other one of the electronic whiteboard 2c and the transmission terminal 8.

The management system 50 centrally manages, for example, the communication status between the electronic whiteboard 2c and the transmission terminal 8.

According to the present embodiment, the communication network 9a is an intranet, and the communication network 9b is the Internet. However, the communication networks 9a and 9b are not limited to the above configuration, and may be any desired communication network selected from the Internet, the local area network (LAN), the intranet, the mobile phone network, or the like. Alternatively, the communication networks 9a and 9b may be the same network. For example, both the communication networks 9a and 9b may be the Internet.

<Hardware Configuration of Electronic Whiteboard>

The hardware configuration of the electronic whiteboard 2 according to the present embodiment is described with reference to FIG. 2.

Figure 2:
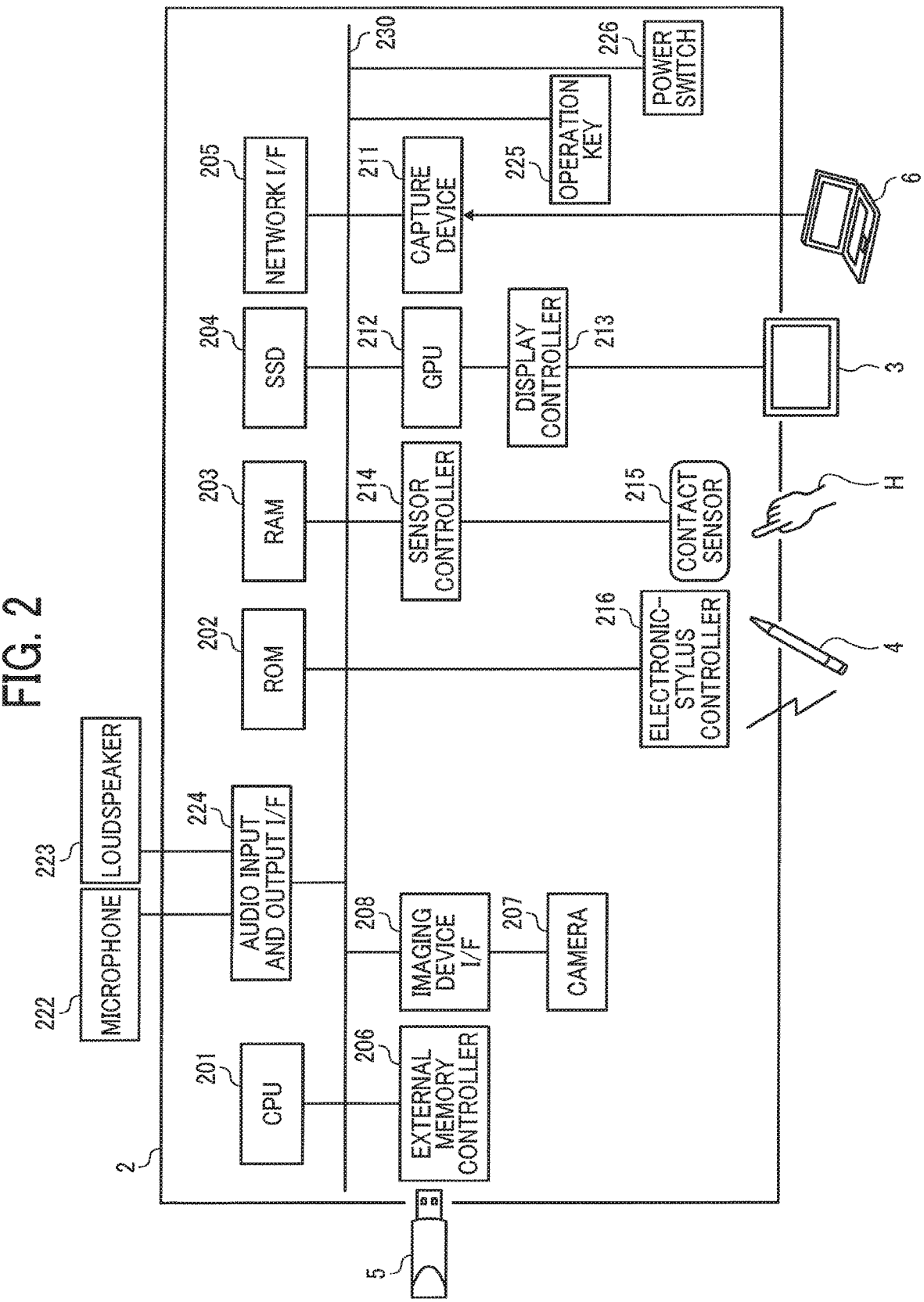
FIG. 2 is a schematic block diagram illustrating a hardware configuration of an electronic whiteboard, according to an embodiment of the present disclosure.

FIG. 2 is a schematic block diagram illustrating a hardware configuration of the electronic whiteboard 2 according to the present embodiment.

As illustrated in FIG. 2, the electronic whiteboard 2 includes, for example, a central processing unit (CPU) 201 that controls the overall operation of the electronic whiteboard 2, a read only memory (ROM) 202 that stores a control program used for controlling the CPU 201 such as an initial program loader (IPL), a random access memory (RAM) 203 that is used as work area for the CPU 201, a solid state disk (SSD) 204 that stores various data such as a control program for the electronic whiteboard 2, a network interface (I/F) 205 that controls the communication with an external device through the communication network 9, and an external memory controller 206 that controls the communication with an external device such as a universal serial bus (USB) memory 5. Further, the electronic whiteboard 2 includes, for example, a camera 207 that captures a target object under the control of the CPU 201, an imaging device interface (I/F) 208 that controls the operation of the camera 207, a capture device 211 that controls the display of a laptop personal computer (PC) 6 to display the video data as a still image or moving images, a graphics processing unit (GPU) 212 dedicated to processing graphics, and a display controller 213 that controls the visual display to output the image generated by the GPU 212 to the display 3. Further, the electronic whiteboard 2 includes, for example, a sensor controller 214 that controls operation of the contact sensor 215, and a contact sensor 215 that detects a touch onto the display 3, which is made by, for example, an electronic stylus 4 and a user's hand H. The contact sensor 215 according to the present embodiment senses a touch input to a specific coordinate on the display 3 using the infrared blocking system. More specifically, the display 3 is provided with two light receivers and light emitters disposed on both upper ends of the display 3, and a reflector frame disposed on the periphery of the display 3. The light receivers and light emitters emit a plurality of infrared rays in parallel to a touch panel of the display 3. The light receivers and light emitters receive lights passing in the direction that is the same as that of an optical path of the emitted infrared rays, which are reflected by the reflector frame. By so doing, a touch input to specific coordinates is sensed. The contact sensor 215 outputs to the sensor controller 214 the identification (ID) of the infrared light rays that are emitted from the two light receivers and light emitters and then are blocked by an object such as the hand H, and the sensor controller 214 specifies the coordinates of the position touched by the object. Note also that all sorts of ID as described below are an example of identification information.

In the present embodiment, the contact sensor 215 uses the infrared blocking system. However, no limitation is intended therein, and the contact sensor 215 may use various types of detectors such as a capacitive touch panel that detects changes in capacitance to specify a touched position, a resistive touch panel that senses changes in voltage between two facing resistive membranes to specify a touched position, and an electromagnetic induction type touch panel that detects electromagnetic induction caused when an object touches a display to specify a touched position. Alternatively, the contact sensor 215 may identify the contact position using the camera 207.

The electronic whiteboard 2 is provided with an electronic stylus controller 216. The electronic stylus controller 216 communicates with the electronic stylus 4 to detect a touch by the tip or bottom of the electronic stylus 4 to the display 3. In addition or in alternative to detecting a touch by the tip or bottom of the electronic stylus 4, the electronic stylus controller 216 may also detect a touch by another part of the electronic stylus 4, such as a part held by a hand.

Further, the electronic whiteboard 2 includes, for example, an audio input and output interface (I/F) 224 that controls the input and output of an audio signal between an external microphone 222 and an external loudspeaker 223 under the control of the CPU 101, an operation key 225 that accepts user's operation, and a power switch 226 that turns on or turns off the power of the electronic whiteboard 2. Note also that any of the microphone 222 and the loudspeaker 223 may be built into the electronic whiteboard 2.

Further, the electronic whiteboard 2 includes, for example, a bus line 230, such as an address bus or a data bus, which electrically connects the elements illustrated in FIG. 2 to one another.

The control program for the electronic whiteboard 2 may be stored on a computer-readable recording medium such as a CD-ROM for distribution, or stored on a server on any desired network to be downloaded.

<Hardware Configuration of Management System>

The hardware configuration of the management system 50 according to the present embodiment is described with reference to FIG. 3.

Figure 3:
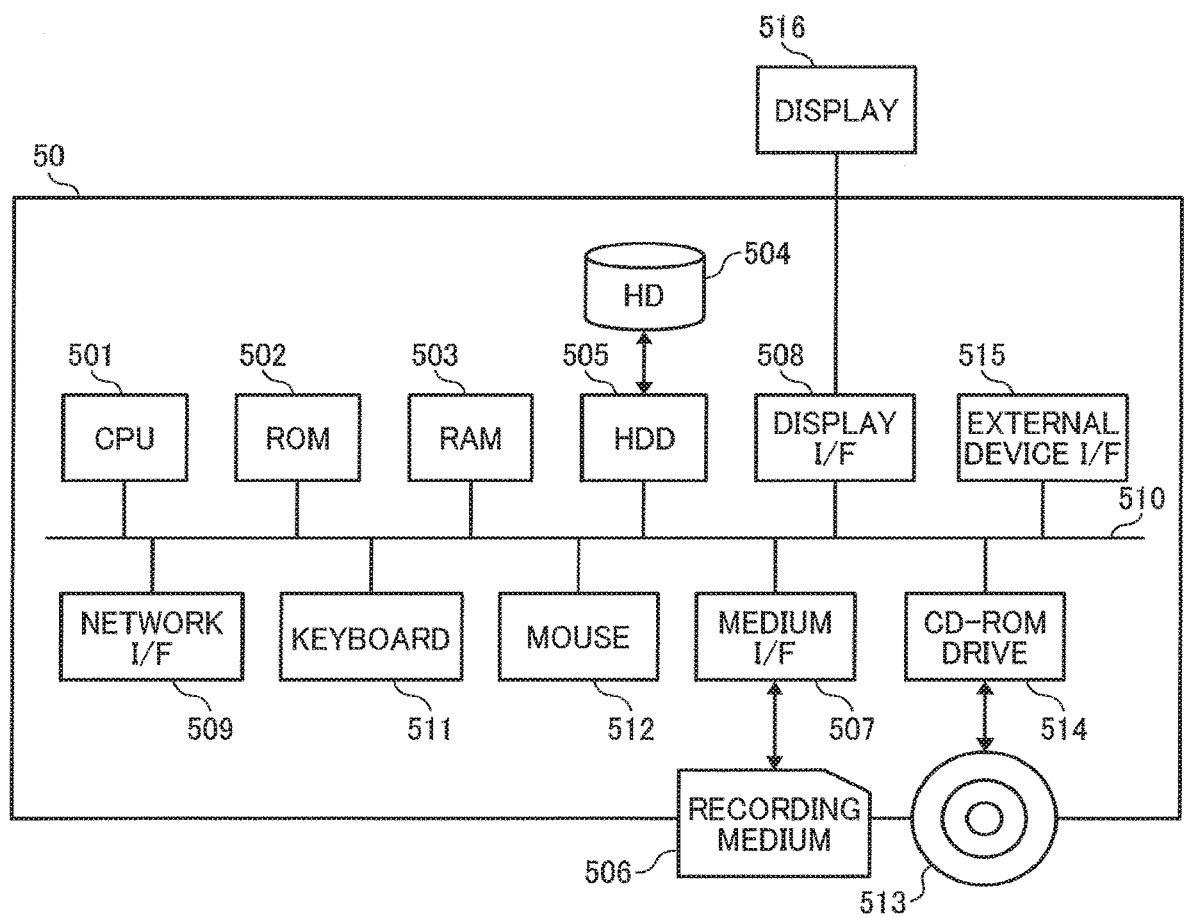
FIG. 3 is a schematic block diagram illustrating a hardware configuration of a management, system according to an embodiment of the present disclosure.

FIG. 3 is a schematic block diagram illustrating a hardware configuration of the management system 50 according to the present embodiment.

The management system 50 according to the present embodiment includes a CPU 501 that controls the entire operation of the management system 50, a ROM 502 storing a transmission control program, a RAM 503 that is used as a work area for the CPU 501, a hard disk (HD) 504 storing various kinds of data, a hard disk drive (HDD) 505 that controls reading or writing of various kinds of data to or from the HD 504 under control of the CPU 501, and a medium interface (I/F) 507 that controls reading or writing of data to or from a recording medium 506 such as a flash memory. Moreover, the management system 50 according to the present embodiment includes a display interface (I/F) 508 that controls the display 516 to display various kinds of information such as a cursor, a menu, a window, a character, and an image, a network interface (I/F) 509 that transmits data using the communication network 9, a keyboard 511 that is provided with a plurality of keys for allowing a user to input, for example, characters, numerical values, and various kinds of instructions, a mouse 512 that is one example of pointing device for allowing a user to select or execute various kinds of instructions, select a target to be processed, or to move a mouse cursor being displayed. Further, the management system 50 according to the present embodiment includes a compact disc read only memory (CD-ROM) drive 514 that reads or writes various kinds of data to and from a CD-ROM 513, which is one example of removable recording medium, an external device interface (I/F) 515 that exchanges data with an external device, and a bus line 510, such as an address bus or a data bus, which electrically connects the elements illustrated in FIG. 2 to one another.

The above transmission control program is in an installable or executable file format, and may be recorded on a computer-readable recording medium such as the recording medium 506 and the CD-ROM 513 for distribution. The above transmission control program may be stored on the HD 504.

The hardware configuration of the relay device 30 and the hardware configuration of the laptop PC 6 are equivalent to that of the management system 50, and thus their description is omitted.

<Hardware Configuration of Transmission Terminal>

Figure 4:
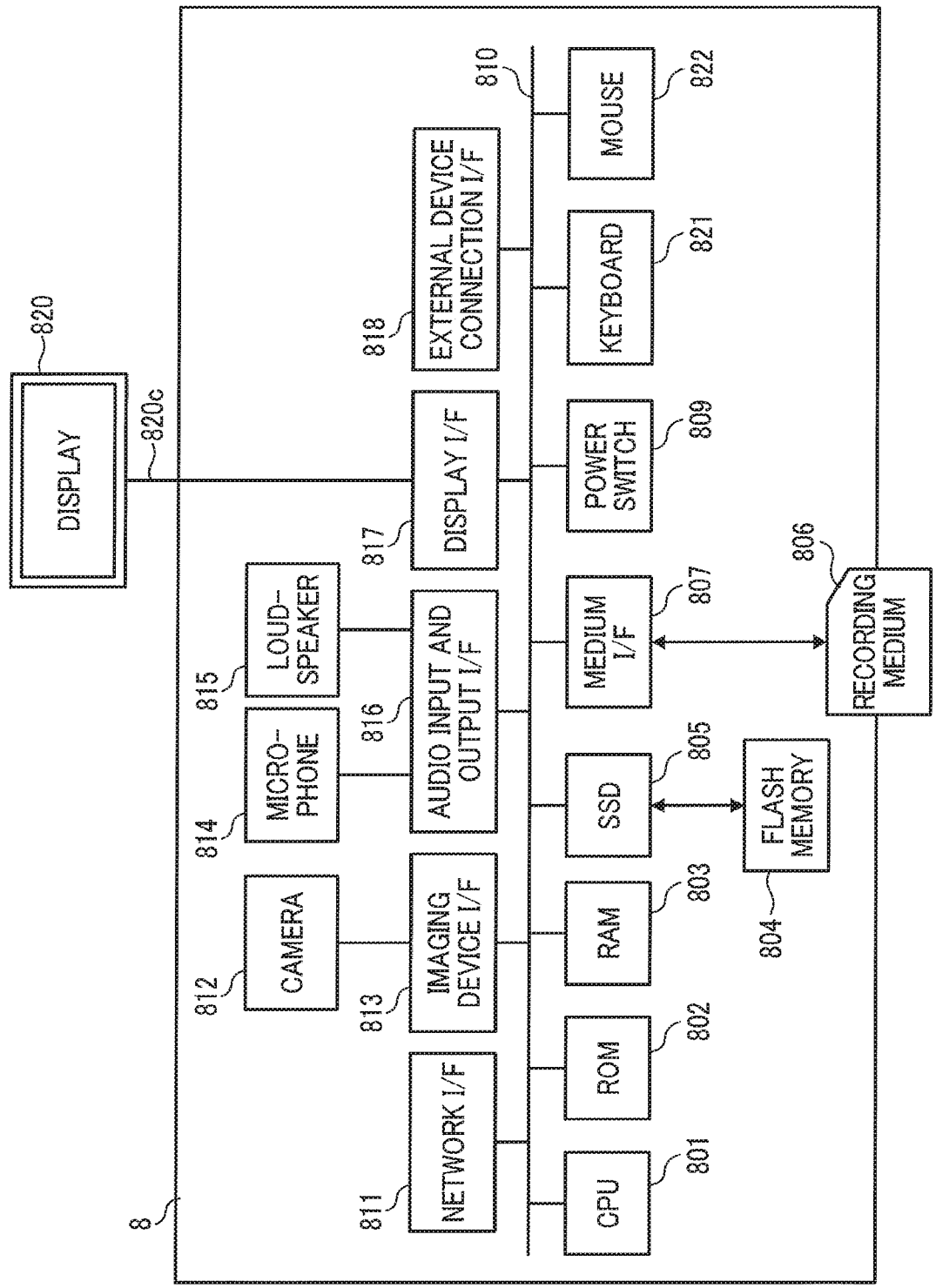
FIG. 4 is a schematic block diagram illustrating a hardware configuration of a transmission terminal according to an embodiment of the present disclosure.

FIG. 4 is a schematic block diagram illustrating a hardware configuration of the transmission terminal 8 operating as a video conference terminal, according to the present embodiment.

The transmission terminal 8 includes, for example, a central processing unit (CPU) 801, a read only memory (ROM) 802, a random access memory (RAM) 803, a flash memory 804, a solid state drive (SSD) 805, a medium interface (I/F) 807, a power switch 809, a bus line 810, a network interface (IF) 811, a camera 812, an imaging device interface (I/F) 813, a microphone 814, a loudspeaker 815, an audio input and output interface (I/F) 816, a display interface (I/F) 817, an external device connection interface (I/F) 818, a keyboard 821, and a mouse 822. The CPU 801 controls the overall operation of the transmission terminal 8. The ROM 802 stores a control program such as an initial program loader (IPL) used for operating the CPU 801. The RAM 803 is used as a work area for the CPU 801. The flash memory 804 stores various kinds of data such as a communication control program, display data, and audio data. The SSD 805 controls reading or writing of various kinds of data to or from the flash memory 804 under control of the CPU 801. As an alternative to the SSD, a hard disk drive (HDD) may be used. The medium interface 807 controls reading or writing of data to or from a recording medium 806 such as a flash memory.

The network interface 811 controls data communication with an external device through the communication network 9b. The camera 812 is an example of a built-in imaging device that captures an object under the control of the CPU 801 to obtain display data. The imaging device interface 813 is a circuit that controls operation of the camera 812. The microphone 814 is an example of a built-in sound collector capable of receiving audio data. The audio input and output interface 816 is a circuit for controlling an input and output of an audio signal between the microphone 814 and the loudspeaker 815, under control of the CPU 801. The display interface 817 is a circuit for transmitting display data to an external display 820 under control of the CPU 801. The external device connection interface 818 is an interface circuit that connects the transmission terminal 8 to various kinds of external devices. The keyboard 821 is one example of input device provided with a plurality of keys for allowing an user to input characters, numerical values, or various kinds of instructions. The mouse 822 is one example of pointing device for allowing a user to select or execute various kinds of instructions, select a target to be processed, or to move a mouse cursor being displayed.

The bus line 810 is, for example, an address bus or a data bus, which electrically connects a plurality of elements as illustrated in FIG. 4 such as the CPU 801.

The display 820 is an example of a display unit composed of a liquid crystal or organic electroluminescence (EL) display that displays, for example, an image of an object and an operation icon. Moreover, the display 820 is connected to the display interface 817 by a cable 820c. The cable 820c may be an analog RGB (red, green, blue) (video graphic array (VGA)) signal cable, a component video cable, a high-definition multimedia interface (HDMI, registered trademark) signal cable, or a digital video interactive (DVI) signal cable.

The camera 812 includes a lens, and a solid-state image sensing device that converts an image or moving images (video) of an object into electronic data through photoelectric conversion. As the solid-state image sensing device, for example, a complementary metal oxide semiconductor (CMOS) or a charge-coupled device (CCD) is used. The external device connection interface 818 is capable of connecting an external device such as an external camera, an external microphone, or an external loudspeaker thereto through a universal serial bus (USB) cable or the like.

The recording medium 806 is removable from the transmission terminal 8. The flash memory 804 may be replaced with any nonvolatile memory such as an electrically erasable and programmable read only memory (EEPROM) that reads or writes data under control of the CPU 801.

<Software Configuration of Communication Terminal>

Figure 5A:
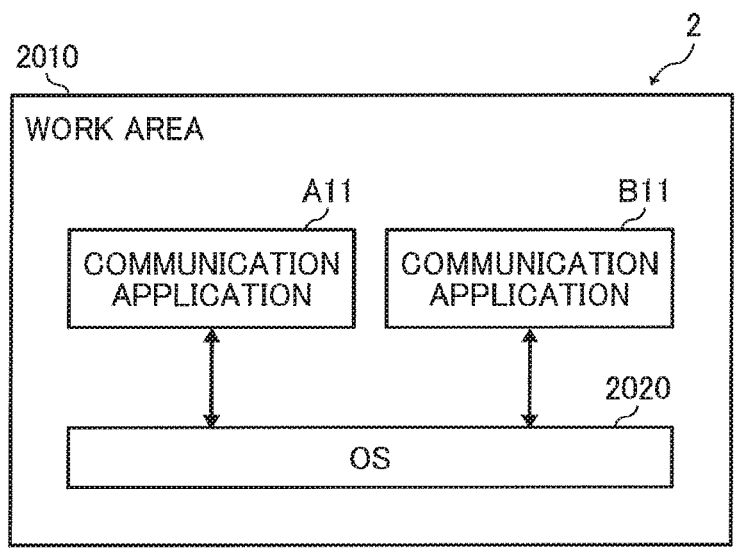
FIG. 5A and FIG. 5B are schematic block diagrams each illustrating a software configuration of an electronic whiteboard or a transmission terminal, respectively, according to an embodiment of the present disclosure.

FIG. 5A is a schematic block diagram illustrating a software configuration of the electronic whiteboard 2, according to the present embodiment.

As illustrated in FIG. 5A, the electronic whiteboard 2 is installed with an operating system (OS) 2020, a first communication application A11, and a second communication application B11, each of which operates on a work area 2010 of the RAM 203.

The OS 2020 is basic software that controls entire operation of the electronic whiteboard 2 through providing basic functions. The communication application A11 and B11 each enable the electronic whiteboard 2 to communicate with another electronic whiteboard (or communication terminal), using different communication protocols. The communication application A11 is a client application that provides the electronic whiteboard 2 with a communication control function of controlling transmission of stroke data to another communication terminal, and an image processing function of outputting the stroke data as an image. The communication application B11 is a client application that provides the electronic whiteboard 2 with a communication control function of sending and receiving the video data or audio data of a conference or the like to or from another communication terminal, an image processing function of inputting and outputting the video data, and an audio processing function of inputting and outputting the audio data.

The OS 2020 and the communication application A11 are installed onto the electronic whiteboards 2a, 2b, and 2c before shipment. The communication application B11 may be installed onto the electronic whiteboard 2 as desired after shipment. In the following description, it is assumed that the electronic whiteboard 2c is installed with the communication application B11, but the electronic whiteboards 2a and 2b are not installed with the communication application B11.

Figure 5B:
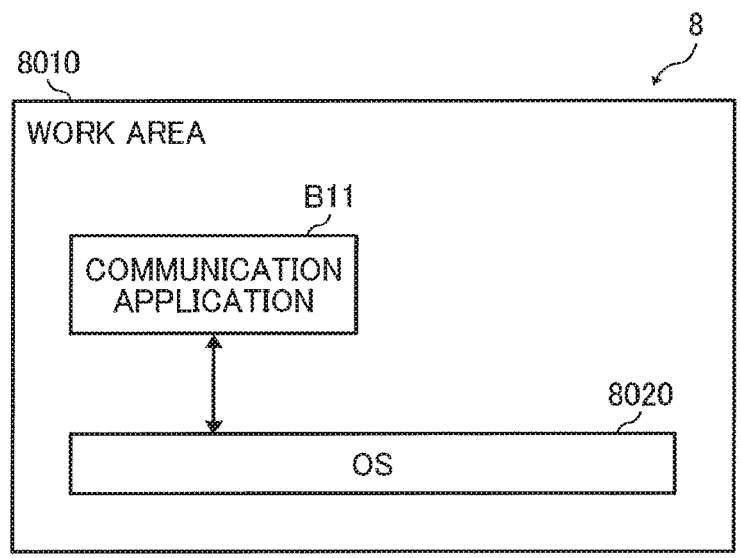

FIG. 5B is a schematic block diagram illustrating a software configuration of the transmission terminal 8, according to the present embodiment.

As illustrated in FIG. 5B, the OS 8020 and the third communication application B11 are deployed and operate on a work area 8010 of the RAM 803.

The OS 8020 is basic software that controls the entire operation of the transmission terminal 8 through providing basic functions. The communication application B11 provides the transmission terminal 8 with a communication control function of sending and receiving video data of a conference or the like to or from another external communication terminal, and an image processing function of outputting the video data as an image.

The OS 8020 and the communication application B11 are installed onto the transmission terminal 8 before or after shipment.

<<Functional Configuration of Embodiment>>

Next, a functional configuration of the communication system 1 according to the present embodiment is described.

Figure 6:
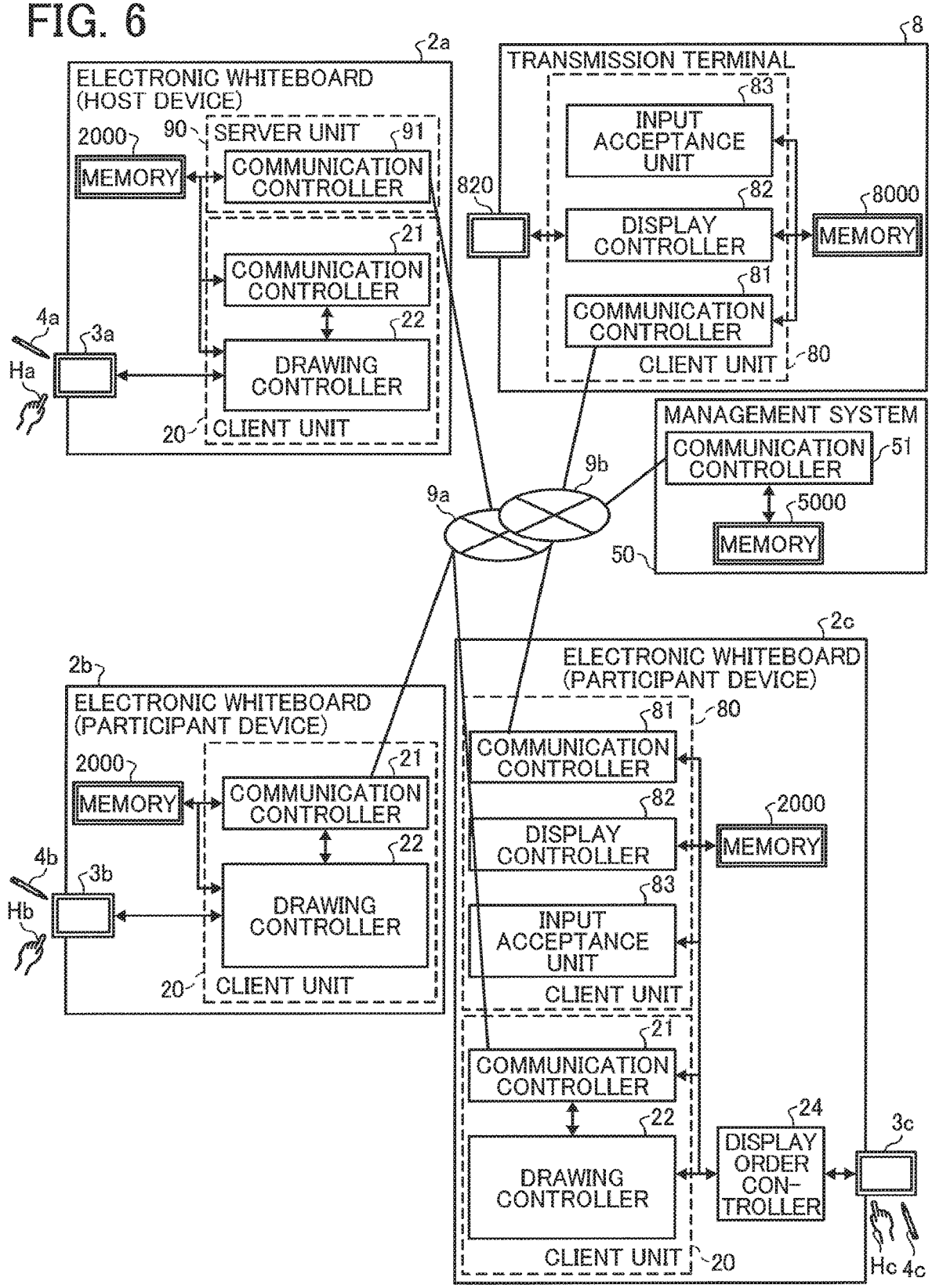
FIG. 6 is a functional block diagram of a communication system, according to an embodiment of the present disclosure.

FIG. 6 is a schematic block diagram illustrating a functional configuration of the electronic whiteboards 2, the transmission terminal 8, and the management system 50 in the communication system 1, according to the present embodiment.

The electronic whiteboard 2 is provided with the hardware components as illustrated in FIG. 2 which operate in cooperation with the control programs, thereby implementing the functional configuration as illustrated in FIG. 6. Moreover, the electronic whiteboard 2 includes a memory 2000 implemented by the SSD 204. The transmission terminal 8 is provided with the hardware components as illustrated in FIG. 4 that operate in cooperation with the control programs, thereby implementing the functional configuration as illustrated in FIG. 6. Moreover, the transmission terminal 8 includes a memory 8000 implemented by the SSD 805.

The electronic whiteboard 2 may serve as a "host device" that firstly requests to start communication to share images (remote sharing), or may serve as a "participant device" that later participates in the communication (remote sharing) already started by the host device. In broad outline, the electronic whiteboard 2 consists of a client unit 20 and a server unit 90. The client unit 20 and the server unit 90 are functions implemented by one electronic whiteboard 2, with activation of the communication application A11. Alternatively, the electronic whiteboard 2 may only include the client unit 20, and a device such as a distribution controller other than the electronic whiteboard 2 may implement the server unit 90.

When the electronic whiteboard 2 serves as a host device, both the client unit 20 and the server unit 90 are implemented by the electronic whiteboard 2. Moreover, when the electronic whiteboard 2 serves as a participant device, only the client unit 20 is implemented by the electronic whiteboard 2, and the server unit 90 is not implemented. In other words, when the electronic whiteboard 2a serves as a host device and the electronic whiteboards 2b and 2c serve as participant devices, the client unit 20 of the electronic whiteboard 2a communicates with the client unit 20 of each of the other electronic whiteboards 2b and 2c, through the server unit 90 implemented in the same electronic whiteboard 2a. By contrast, the client unit 20 of each one of the electronic whiteboards 2b and 2c communicates with the client unit 20 of each of the other electronic whiteboard 2a, 2b, or 2c, through the server unit 90 implemented in the electronic whiteboard 2a.

<Functional Configuration of Client Unit 20>

As the communication application A11 is started in the electronic whiteboard 2, the client unit 20 starts operating. The client unit 20 includes a communication controller 21 and a drawing controller 22.

The communication controller 21 is implemented by the network interface 205 or the instructions from the CPU 201, and controls the communication performed with another electronic whiteboard 2 or the communication performed with the server unit 90 or the like of the same electronic whiteboard 2.

The drawing controller 22 is implemented by the instructions from the CPU 201, and performs image processing based on the stroke data generated in response to operation made on the display 3, or based on various kinds of data obtained from any desired device. Examples of such a device include, but not limited to, the USB memory 5, the laptop PC 6, the communication controller 21, and the memory 2000. The drawing controller 22 generates an image layer based on the processed image data, and controls output of a combined image where a plurality of image layers are superimposed on top of one another.

Figure 7:
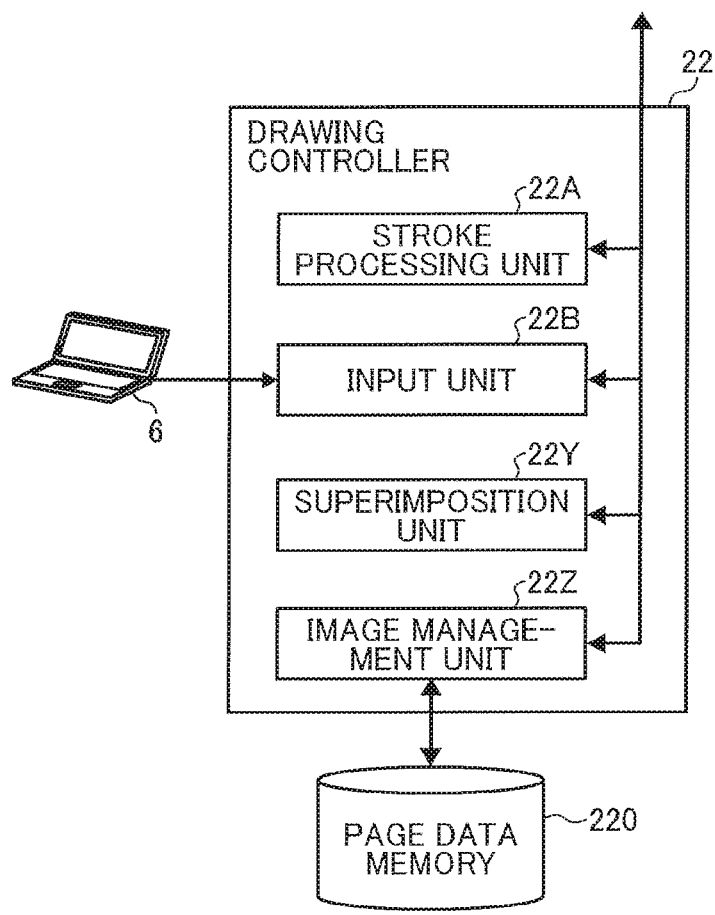
FIG. 7 is a functional block diagram of a drawing controller according to an embodiment of the present disclosure.

FIG. 7 is a functional block diagram of the drawing controller 22, according to the present embodiment.

The drawing controller 22 includes a stroke processing unit 22A, an input unit 22B, a superimposition unit 22Y, and an image management unit 22Z.

The stroke processing unit 22A may be implemented by the instructions from the CPU 201, and generates stroke data that reflects the user's drawing on the display 3 with the electronic stylus 4 or the user's hand H.

The input unit 22B may be implemented by the instructions from the CPU 201 and the capture device 211, and inputs the moving images output from the laptop PC 6 to the electronic whiteboard 2 as data. Note also that the input unit 22B may be a function implemented by an application other than the communication application A11 operating on the electronic whiteboard 2.

The superimposition unit 22Y may be implemented by the instructions from the CPU 201, and generates a plurality of image layers based on each type of data and superimposes those image layers on top of one another.

The image management unit 22Z may be implemented by the instructions from the CPU 201, and manages the images to be displayed on the electronic whiteboard 2.

The page data memory 220 is a memory area of the memory 2000, and stores page data as depicted in Table 1 given below. Table 1 is a diagram illustrating an example data structure of the page data. The page data includes one-page data to be displayed on the display 3, which includes stroke arrangement data (items of stroke data for one character, etc.) and medium data.

TABLE 1

| PAGE DATA ID | START TIME | END TIME | STROKE ARRANGEMENT DATA ID | MEDIUM DATA ID |
|---|---|---|---|---|
| p001 | 20150522152034 | 20150522152402 | st001 | m001 |
| p002 | 20150522152415 | 20150522152825 | st002 | m002 |

TABLE 1-continued

| PAGE DATA ID | START TIME | END TIME | STROKE ARRANGEMENT DATA ID | MEDIUM DATA ID |
|---|---|---|---|---|
| p003 | 20150522153345 | 20150522154033 | st003 | m003 |
| ... | ... | ... | ... | ... |

In the page data, page data ID by which any desired one page is identified, the start time at which the display of that page is started, the end time when rewriting of page is no longer performed, for example, by stroke and gesture, stroke arrangement data ID that identifies the stroke arrangement data caused by the stroke of the electronic stylus 4 or the user's hand H, and medium data ID that identifies the medium data are stored in association with each other. The stroke arrangement data is used to display a set of stroke images on the display 3. The medium data is used to display another image overlapping with the stroke image on the display 3.

The stroke arrangement data includes information in detail as depicted in FIG. 21.

FIG. 14 is a diagram illustrating stroke arrangement data according to the present embodiment.

Due to this configuration, the coordinate arrangement data indicates those multiple way points in the stroke drawing.

The medium data of the page data in Table 1 includes more detailed information as depicted in Table 2. Table 2 depicts an example data structure of medium data. In the medium data, the medium data ID included in the page data depicted in Table 1, the type of data of the medium data, the time at which the medium data is stored, the position (X coordinate value, Y coordinate value) of the image to be displayed on the display 3 according to the medium data, and the size (width, height) of the image, as well as the data indicating the contents of the medium data are associated with each other. Among these items of data, the position of the image to be displayed on the display 3 according to the medium data indicates the upper-left corner of the image that is displayed according to the medium data assuming that the coordinates of upper-left corner of the display 3 is (X coordinate value, Y coordinate value)=(0, 0).

TABLE 2

| MEDIUM DATA ID | TYPE OF DATA | RECORDED TIME | X COORDINATE VALUE | Y COORDINATE VALUE | WIDTH | HEIGHT | DATA |
|---|---|---|---|---|---|---|---|
| m001 | image | 20150522152632 | 0 | 0 | 1920 | 1080 | abc.jpg |
| m002 | image | 20150522153002 | 277 | 156 | 1366 | 768 | bcd.jpg |
| m003 | image | 20150522154421 | 277 | 156 | 1366 | 768 | cde.jpg |
| ... | ... | ... | ... | ... | ... | ... | ... |

As illustrated in FIG. 14, one stroke arrangement data includes a plurality of items of stroke data. Further, one item of stroke data indicates stroke data ID that identifies that stroke data, the start time at which the writing of one item of stroke starts, the end time at which the writing of one item of stroke ends, the color of the stroke, the width of the stroke, and the coordinate arrangement data ID that identifies the arrangement of way points of the stroke. For example, when the user draws an alphabet "S" with the electronic stylus 4 with a single stroke, one item of stroke data ID is assigned to the single character of alphabet "S". However, when the user draws an alphabet "T" with the electronic stylus 4 with two strokes, two items of stroke data ID are assigned to the single character of alphabet "T".

Further, the coordinate arrangement data includes information in detail as depicted in FIG. 15.

FIG. 15 is a diagram illustrating an example data structure of the coordinate arrangement data, according to the present embodiment.

The coordinate arrangement data indicates several items of information including a point on the display 3 (X coordinate value, Y coordinate value), the difference in time (millisecond (ms)) when passing through this point since the start time of the stroke, and the writing pressure of the electronic stylus 4 on that point. In other words, a collection of several points depicted in FIG. 15 is indicated by one item of coordinate arrangement data as depicted in FIG. 21. For example, when the user draws an alphabet "S" using the electronic stylus 4 with a single stroke, a plurality of way points are passed through to complete the drawing of "S".

<Functional Configuration of Server Unit 90>

The server unit 90 includes a communication controller 91.

The communication controller 91 is implemented by the instructions from the CPU 201, and controls communication, through the communication network 9a, between the communication controller 21 in the client unit 20 of the same electronic whiteboard 2 and the communication controller 21 in the client unit 20 of another one of the electronic whiteboards 2.

<Functional Configuration of Client Unit 80>

As the communication application B11 is started in the electronic whiteboard 2 or the transmission terminal 8, the client unit 80 starts operating. The client unit 80 includes a communication controller 81, a display controller 82, and an input acceptance unit 83.

The communication controller 81 may be implemented by the instructions from the CPU 201 or the CPU 801 or the network interface 205 or the network interface 811, and controls communication with another communication terminal or the like.

The display controller 82 may be implemented by the instructions from the CPU 201 or the CPU 801, and performs image processing based on data obtained from the memory 2000, the memory 8000, or the like, and controls output of processed image data.

The input acceptance unit 83 may be implemented by the instructions from the CPU 201 or the CPU 801, and receives various kinds of operation or input made by a user.

<Display Order Controller>

The electronic whiteboard 2c further includes a display order controller 24. The display order controller 24 starts operating as the OS 2020 is started in the electronic whiteboard 2c.

The display order controller 24 may be implemented by the instructions from the CPU 201, and activates one of the images generated by the client units 20 and 80 and deactivates the other one of the images. Due to this configuration, the display order of these images is controlled. More specifically, the processes of activating one of the images consist of the processes of displaying that image to the front compared with the other images, and the processes of deactivating one of the images consist of the processes of displaying the other images to the front compared with the deactivated image.

<Functional Configuration of Management System 50>

The management system 50 is provided with the hardware components as illustrated in FIG. 3 that operate in cooperation with control programs, thereby implementing each functional configuration as illustrated in FIG. 6. The management system 50 also includes a memory 5000 that is implemented by the HD 504 illustrated in FIG. 3.

The communication controller 51 of the management system 50 may be implemented by the instructions from the CPU 501, and control communication with the electronic whiteboard 2 or the transmission terminal 8 through the communication network 9b.

<<Processes>>

Next, the processes according to the present embodiment are described.

<Establishment of Communication among Electronic Whiteboards>

Figure 8:
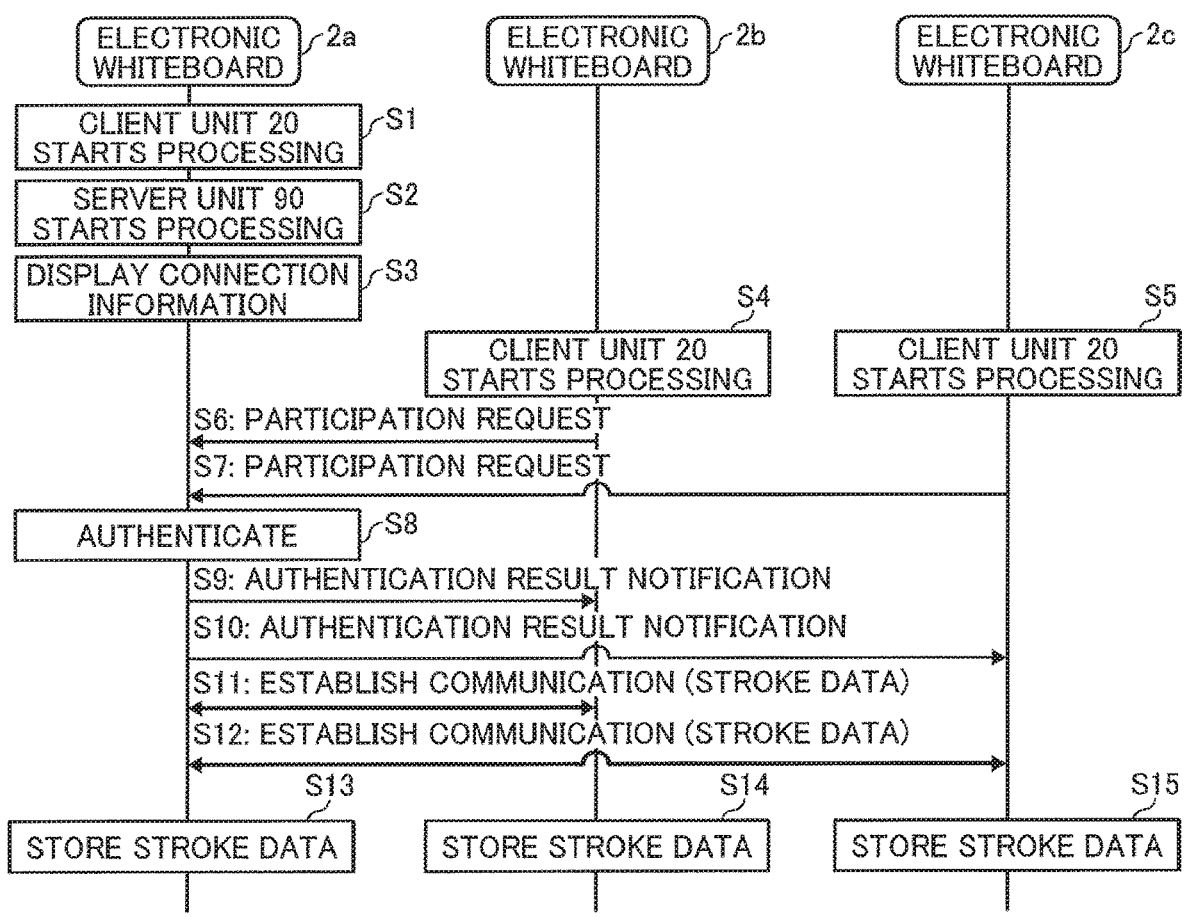
FIG. 8 is a sequence diagram illustrating the processes of establishing communication among a plurality of electronic whiteboards, according to an embodiment of the present disclosure.

With reference to FIG. 8, the processes of establishing communication among the electronic whiteboards 2a, 2b, and 2c, using the communication application A11, are described.

FIG. 8 is a sequence diagram illustrating the processes of establishing communication among a plurality of electronic whiteboards, according to the present embodiment.

Once the power switch 226 of the electronic whiteboard 2a is turned on, the communication application A11 starts operating, and the client unit 20 of the electronic whiteboard 2a starts processing (step S1). Then, once a request to hold a conference is accepted by operation made on the display 3a, the communication controller 21 of the client unit 20 sends instructions to start the processing of the server unit 90 to the communication controller 91 in the server unit 90 of the same electronic whiteboard 2a. Due to this configuration, not only the client unit 20 but also the server unit 90 of the electronic whiteboard 2a starts various kinds of processing (step S2).

The communication controller 91 of the electronic whiteboard 2a generates connection information to establish a connection with the electronic whiteboard 2a, and controls the display 3a to display the generated connection information (step S3). Such connection information includes the IP address of the host device and a pass code generated for the present remote sharing, and the pass code is stored in the memory 2000. Moreover, a user of the electronic whiteboard 2a notifies the users of the electronic whiteboards 2b and 2c of the connection data by means of, for example, telephone or electronic mail.

Next, once the power switch 226 of each of the electronic whiteboards 2b and 2c is turned on, the communication application A11 starts operating in the electronic whiteboards 2b and 2c, and the client unit 20 of each of the electronic whiteboards 2b and 2c starts processing (steps S4 and S5). Once input of connection information is accepted by operation made on the displays 3b and 3c of the electronic whiteboards 2b and 2c, the communication controller 21 in the client unit 20 of each of the electronic whiteboards 2b and 2b transmits a participation request including a pass code to the communication controller 91 in the server unit 90 of the electronic whiteboard 2a, based on the IP address included in the connection information, through the communication network 9a (steps S6 and S7). The communication controller 91 of the electronic whiteboard 2a receives the participation requests including the pass code from each of the electronic whiteboards 2b and 2c.

Next, the communication controller 91 determines whether or not each one of the electronic whiteboards 2b and 2c is to be authenticated using the pass codes received from the electronic whiteboards 2b and 2c with reference to the pass codes stored in the memory 2000 (step S8). Then, the communication controller 91 notifies each of the client units 20 of the electronic whiteboard 2b and 2c of the authentication result (steps S9 and S10). When the electronic whiteboards 2b and 2c are determined to be an authorized electronic whiteboard in the authentication of the step S8, the electronic whiteboard 2a that serves as the host device establishes a communication for remote sharing with the electronic whiteboard 2b and electronic whiteboard 2c each of which serves as a participant device (steps S11 and S12). In the description of the present embodiment, it is assumed that contents of data exchanged among the electronic whiteboards 2a, 2b, and 2c include stroke data.

When a user draws a stroke image on one of the electronic whiteboards 2a. 2b, and 2c using the electronic stylus 4a, 4b, or 4c, the stroke processing unit 22A of the corresponding one of the electronic whiteboards 2a, 2b, and 2c generates the stroke data of the drawn stroke image based on the coordinates of the contact portion between the electronic styluses 4a, 4b, or 4c and the displays 3a, 3b, or 3c. The communication controller 21 of the relevant one of the electronic whiteboards 2a, 2b, and 2c sends the generated stroke data to the communication controller 91 of the electronic whiteboard 2 that serves as the host device.

As the stroked data is received from the electronic whiteboards 2a, 2b, and 2c, the communication controller 91 of the electronic whiteboard 2a transmits the stroke data to the client units 20 of the electronic whiteboards 2a, 2b, and 2c. The transmitted stroke data is received by the communication controllers 21 of the electronic whiteboards 2a, 2b, and 2c. Each of the image management units 22Z of the electronic whiteboards 2a, 2b, and 2c controls the page data memory 220 to store the newly received stroke data in an added manner without overwriting the previously stored stroke data (steps S13, S14, and S15). Due to this configuration, the communication among the electronic whiteboards 2a, 2b, and 2c is established, and then the stroke data that is generated by any one of the electronic whiteboards 2a. 2b, and 2c is accumulated in the page data memories 220 of the electronic whiteboards 2a, 2b, and 2c.

<Establishment of Communication Between Electronic Whiteboard and Transmission Terminal>

Figure 9:
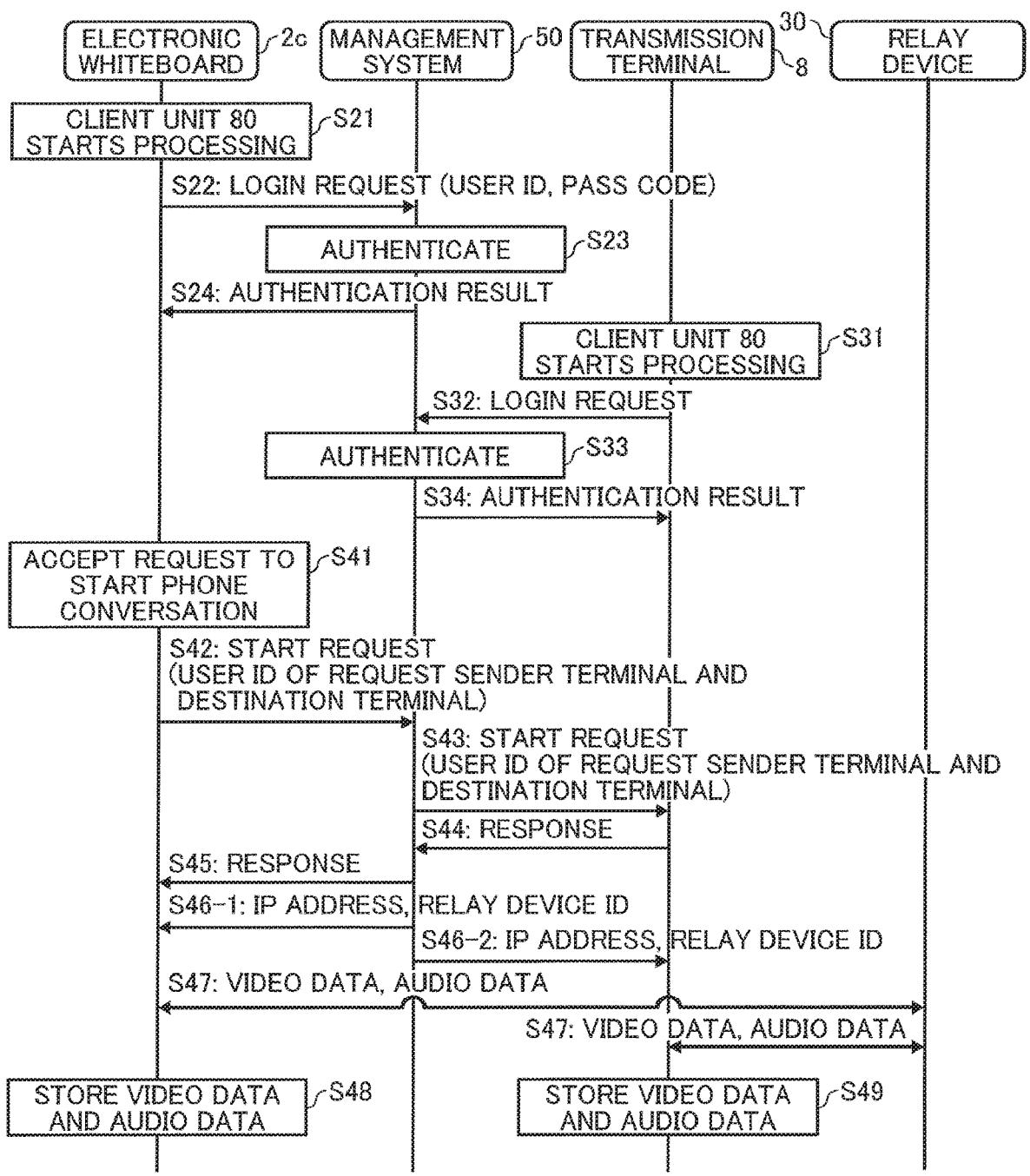
FIG. 9 is a sequence diagram illustrating the processes of establishing communication between an electronic whiteboard and a transmission terminal, according to an embodiment of the present disclosure.

With reference to FIG. 9, the processes of establishing communication between the electronic whiteboard 2c and the transmission terminal 8, using the communication application B11, are described.

FIG. 9 is a sequence diagram illustrating the processes of establishing communication between the electronic whiteboard 2c and the transmission terminal 8, according to the present embodiment.

As the communication application B11 is started in the electronic whiteboard 2c in response to a user's operation, the client unit 80 starts various kinds of processing (step S21).

The communication controller 81 of the client unit 80 sends a login request to the management system 50 (step S22). This login request includes a user ID and a pass code. Accordingly, the communication controller 51 of the management system 50 receives the login request.

The management system 50 authenticates the electronic whiteboard 2c that has sent the login request (step S23), based on whether a pair of user ID and a pass code included in the login request matches a pair of user ID and a pass code stored in the memory 5000 in advance. The communication controller 51 of the management system 50 sends an authentication result to the electronic whiteboard 2c that has sent the login request (step S24). Accordingly, the communication controller 81 of the electronic whiteboard 2c receives the authentication result. In the following description, cases in which the electronic whiteboard 2c is determined to be an authorized login request sender are described.

Once a request to start the communication application B11 is accepted by user's operation made on the transmission terminal 8, the communication application B11 starts operating, and the client unit 80 of the transmission terminal 8 starts various kinds of processing (step S31).

The communication controller 81 of the transmission terminal 8 sends a login request including the user ID and pass code to the management system 50 (step S32). Then, the management system 50 receives this login request.

The management system 50 authenticates the transmission terminal 8 that has sent the login request using the user ID and the pass code included in the login request (step S33), and sends the authentication result to the transmission terminal 8 (step S34). In the following description, cases in which the transmission terminal 8 is determined to be an authorized login request sender are described.

In response to operation made by a user of the electronic whiteboard 2c, the input acceptance unit 83 of the electronic whiteboard 2c accepts a request to start a communication with the transmission terminal 8 (step S41). In response to the acceptance of the request to start a phone conversation, the communication controller 81 of the electronic whiteboard 2c sends a request to start a phone conversation to the management system 50 (step S42). This request to start a phone conversation includes the user ID of the electronic whiteboard 2c that is the request sender terminal and the user ID of the transmission terminal 8 that is the destination terminal.

When the request to start a phone conversation sent from the electronic whiteboard 2c is received, the communication controller 51 of the management system 50 sends the received request to start a phone conversation to the transmission terminal 8 that is the counterpart terminal (step S43).

The communication controller 81 of the transmission terminal 8 receives the request to start a phone conversation sent from the management system 50. Once a user of the transmission terminal 8 operates the transmission terminal 8 to accept the request to start a phone conversation, the communication controller 81 sends acceptance data to the management system 50 (step S44).

Once the communication controller 51 of the management system 50 receives the acceptance data sent from the transmission terminal 8, the communication controller 51 sends the acceptance data to the electronic whiteboard 2c that has sent the start request (step S45). The communication controller 81 of the electronic whiteboard 2c receives the acceptance data sent from the management system 50.

Then, the management system 50 establishes communication between the electronic whiteboard 2c and the transmission terminal 8 (steps S46-1 and S46-2). In these processes, the communication controller 51 of the management system 50 sends the IP address of the electronic whiteboard 2c or the transmission terminal 8 that serves as the counterpart communication terminal, and the relay device ID of the relay device 30, to the transmission terminal 8 and the electronic whiteboard 2c. The communication controller 81 of each of the transmission terminal 8 and the electronic whiteboard 2c sends the relay device ID and the IP address received from the management system 50 to the relay device 30, and establishes a connection with the relay device 30.

The communication controller 81 of each of the transmission terminal 8 and the electronic whiteboard 2c transmits to the relay device 30 the video data of the video recorded by the camera 207 or the camera 812 on the local terminal side and the audio data of the sound recorded by the microphone 222 or the microphone 814 on the local communication terminal side. The relay device 30 relays the video data and audio data between the transmission terminal 8 and the electronic whiteboard 2c (step S47). The communication controller 81 of each of the transmission terminal 8 and the electronic whiteboard 2c receives the video data and audio data on the counterpart communication terminal side. Note also that the video data includes the image data of a plurality of moving-image frames where the moving images are divided by time, and the audio data includes the audio data of predetermined length of time where the sound is divided by time.

Once the communication controller 81 of the electronic whiteboard 2c newly receives the image data and audio data, updates the image data and audio data stored in the memory 2000 to the newly received image data and audio data (steps S48 and S49). Due to this configuration, the latest image data and audio data are stored in the memory 2000.

<Generation of Image by Communication Application A11>

Next, the processes of generating an image using the communication application A11 are described with reference to FIG. 10A and FIG. 10B.

Figure 10A:
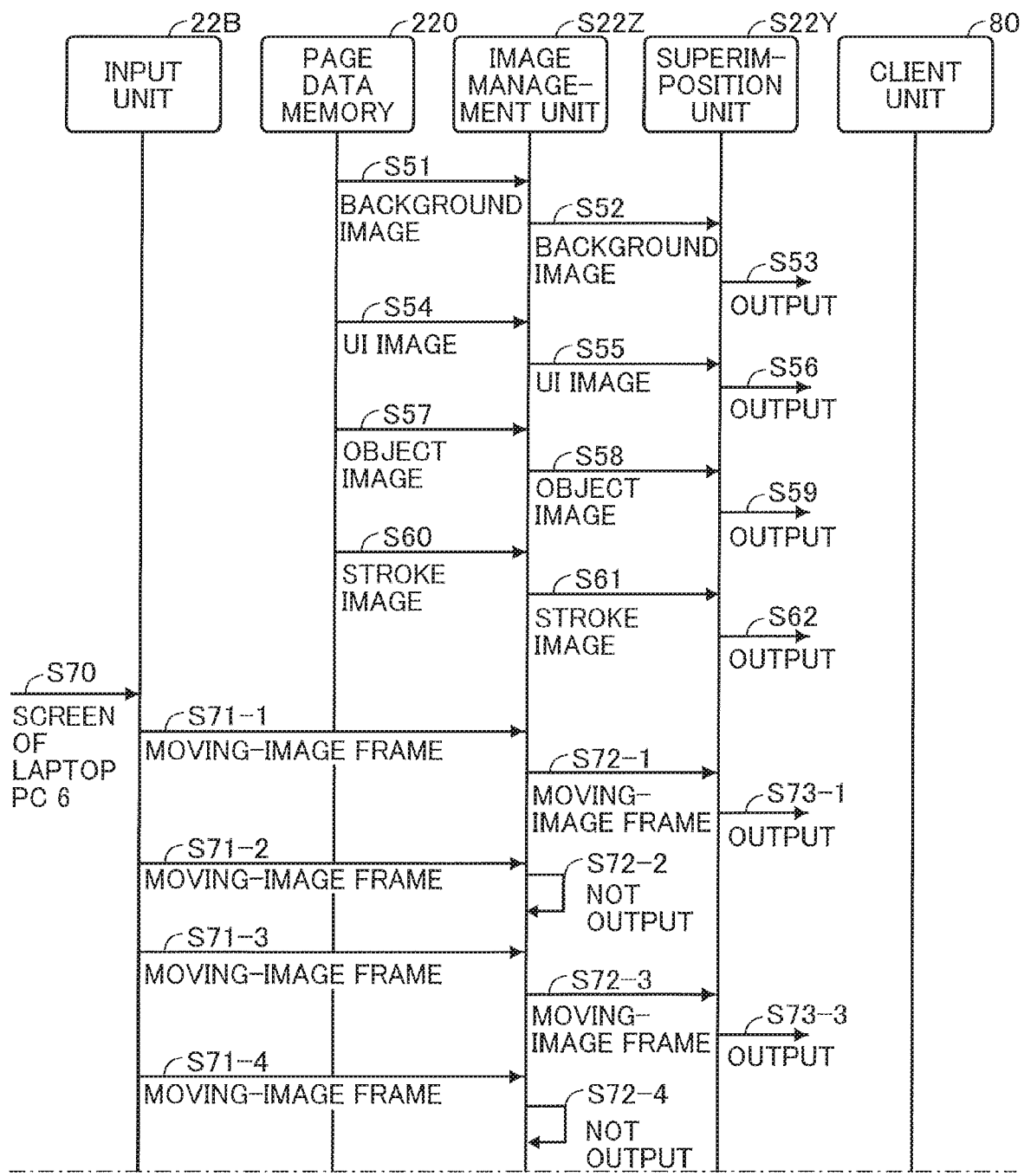
FIG. 10A and FIG. 10B are a data sequence diagram illustrating the processes of generating an image, according to an embodiment of the present disclosure.
Figure 10B:
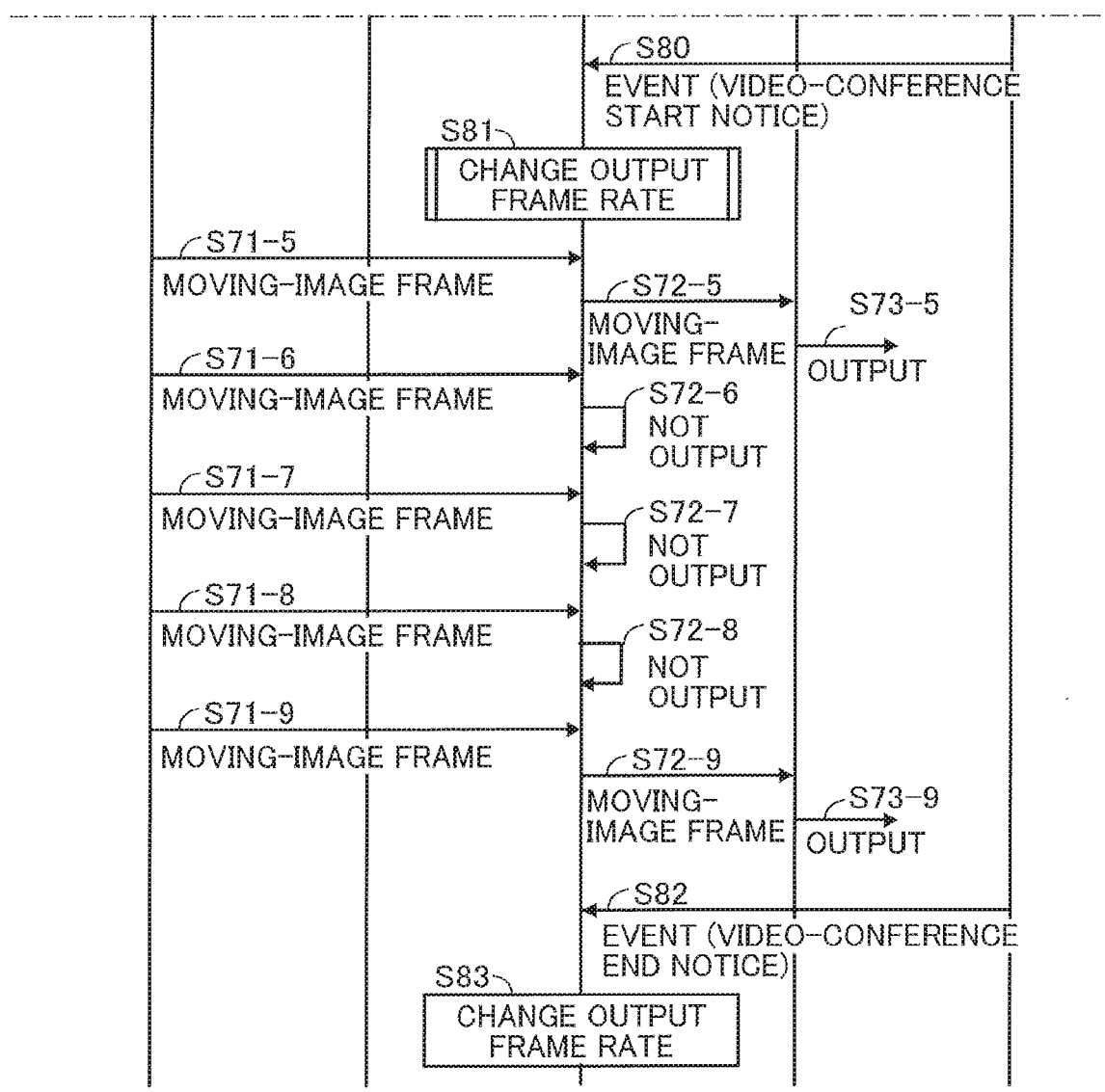

FIG. 10A and FIG. 10B are a flowchart of the processes of generating an image using the communication application A11, according to the present embodiment.

In the following description, the processes of generating an image using the communication application A11 of the electronic whiteboard 2c are described.

The image data of a background image on the screen is stored in the page data memory 220 of the electronic whiteboard 2c. The background image has a nontransparent area of the resolution (size) of the screen of the display 3, and is, for example, a white and plain image. After the client unit 20 is activated, the image management unit 22Z of the electronic whiteboard 2c obtains the image data of a background image stored on the page data memory 220 (step S51). The image management unit 22Z specifies the sequence of the background image in the layers, and controls the superimposition unit 22Y to output the obtained background image (step S52). The sequence in the layers indicates the position of the layer when viewed from a user side when an image where a plurality of layers are superimposed on top of one another is output. In the present embodiment, the sequence of the background image is in the fifth layer (i.e., the last layer).

Figure 11A:
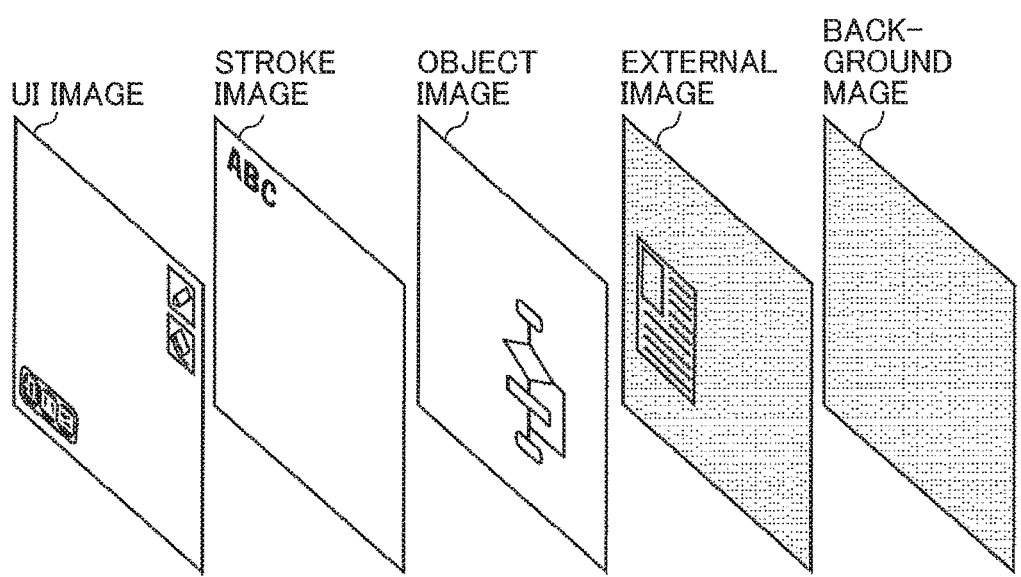
FIG. 11A, FIG. 11B, and FIG. 11C are diagrams each illustrating a superimposed image, according to an embodiment of the present disclosure.

FIG. 11A is a diagram illustrating multiple layers of a superimposed image, according to the present embodiment.

Figure 11B:
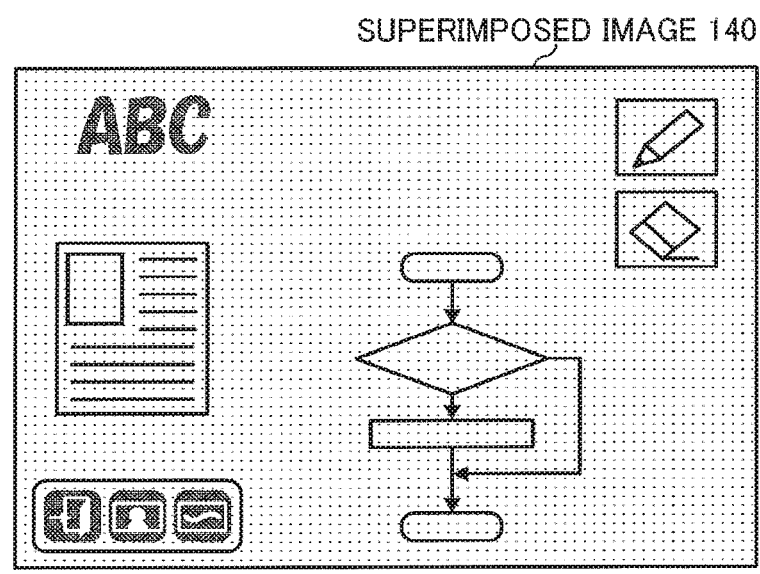

FIG. 11B is a diagram illustrating a superimposed image, according to the present embodiment.

The superimposition unit 22Y of the electronic whiteboard 2c serves as a rendering engine, the superimposition unit 22Y generates and outputs an image including the layer of the background image (step S53). The display order of the image that is output in the step S53 is controlled by the display controller 82, as will be described later in detail, and then is output to the display 3c. Note that the display order indicates priority given to either one of an image that is generated by the communication application A11 or the image of video conference that is generated by the communication application B11.

The page data memory 220 of the electronic whiteboard 2c stores the image data of one or more user interface (UI) images. Such image data of UI images is, for example, an icon or key related to the drawing operation. The image management unit 22Z of the electronic whiteboard 2c obtains the image data of UI images stored on the page data memory 220 (step S54). The image management unit 22Z specifies the layout of the UI images and the sequence of the UI images in the layers, and controls the superimposition unit 22Y to output the UI images (step S55). In the present embodiment, the layout of the UI images is determined by the communication application A11 in advance, and the sequence of the UI images in the first layer (i.e., the foreground) (see FIG. 11A).

The superimposition unit 22Y of the electronic whiteboard 2c outputs a superimposed image where a layer of the background image and a layer of the UI images with a specified layout are superimposed on top of one another in the order listed (step S56). The display order of the superimposed image that is output in the step S56 is controlled by the display controller 82, as will be described later in detail, and then is output to the display 3c.

The page data memory 220 stores the image data (medium data) of one or more object images. The object images are, for example, images of a predetermined object such as a circle, a rectangular, a triangle, or an arrow. When a request from a user to add an object is accepted or a request to add an object is received from the server unit 90 of the electronic whiteboard 2a, the image management unit 22Z in the electronic whiteboard 2c obtains ones related to the request from among the object images stored in the page data memory 220 (step S57). The image management unit 22Z of the electronic whiteboard 2c controls the superimposition unit 22Y to output the object images upon specifying the layout of the object images obtained in the step S57 and the position of the layer of the object images (step S58). In the present embodiment, the layout of the object images is based on the above requests, and the sequence of the object images is in the third layer.

The superimposition unit 22Y of the electronic whiteboard 2c outputs a superimposed image where a layer of the background image, a layer of the object images with a specified layout, and a layer of UI images are superimposed on top of one another in the order listed (step S59). The display order of the superimposed image that is output in the step S59 is controlled by the display controller 82, as will be described later in detail, and then is output to the display 3c.

When the stroke data stored in the page data memory 220 of the electronic whiteboard 2c is updated, the image management unit 22Z obtains stroke data from the page data memory 220 (step S60). The image management unit 22Z of the electronic whiteboard 2c specifies the position of the stroke image and the sequence of the stroke image in the layers, and controls the superimposition unit 22Y to output the stroke image (step S61). In the present embodiment, the position of the stroke image is defined by the stroke data, and the sequence of the stroke image is in the second layer.

The superimposition unit 22Y of the electronic whiteboard 2c outputs a superimposed image where a layer of the background image, a layer of the object images, a layer of the stroke images that are at a specified position, and a layer of UI images are superimposed on top of one another in the order listed (step S62). The display order of the superimposed image that is output in the step S62 is controlled by the display controller 82, as will be described later in detail, and then is output to the display 3c.

While the laptop PC 6c is being connected to the electronic whiteboard 2c, the laptop PC 6c outputs the same image as the one to be output to the display 516 of the laptop PC 6c to the electronic whiteboard 2c (step S70). When an image on the screen of the display 516 of the laptop PC 6c is changed, the laptop PC 6c outputs the changed image to the electronic whiteboard 2c. While the laptop PC 6c is being connected to the electronic whiteboard 2c, the input unit 22B of the electronic whiteboard 2c uses a capturing function as necessary to obtain the images output from the laptop PC 6c, and generates a moving-image frame of the predetermined frame rate (step S71-1 to step S71-9). In the present embodiment, such a predetermined frame rate is 60 fps. However, no limitation is intended thereby.

Figure 11C:
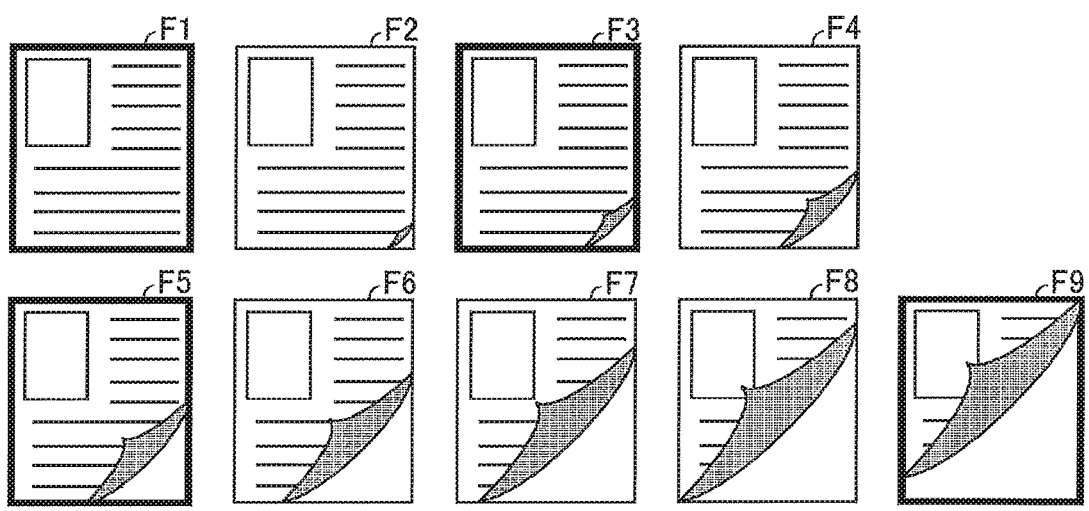

FIG. 11C is a schematic diagram illustrating the moving-image frames generated by the input unit 22B, according to the present embodiment.

The moving-image frames F1 to F9 in FIG. 11C are generated in the steps S71-1 to S71-9, respectively. Note also that the moving-image frames that are output to the display 3c of the electronic whiteboard 2c, as will be described later in detail, are indicated with bold lines in FIG. 11C.

The image management unit 22Z of the electronic whiteboard 2c obtains the moving images at 60 fps generated by the input unit 22B as the images from an external device. The image management unit 22Z changes the frame rate of the obtained moving images of 60 fps to the default frame rate adopted when output on the electronic whiteboard 2c side. In the present embodiment, the default frame rate is 30 fps. In this configuration, every time two moving-image frames are generated at 60 fps by the input unit 22B, the image management unit 22Z controls the superimposition unit 22Y to output one moving-image frame as the fourth layer of external image (step S72-1, step S72-3). Moreover, the image management unit 22Z determines not to output the remaining one moving-image frame among the two moving-image frames (step S72-2, step S72-4).

The superimposition unit 22Y of the electronic whiteboard 2c outputs a superimposed image where a layer of the background image, a layer of the external image including the moving-image frame specified by the image management unit 22Z, a layer of the object images, a layer of the stroke images, and a layer of the UI images are superimposed on top of one another in the order listed (step S73-1, step S73-3). The display order of the superimposed image that is output in the step S73-1 and the step S73-3 is controlled by the display controller 82, as will be described later in detail, and then is output to the display 3c.

Next, cases in which the electronic whiteboard 2c starts communicating with the transmission terminal 8 after a moving-image frame is generated in the step S71-4 are described. The communication controller 81 of the client unit 80 in the electronic whiteboard 2c sends a video-conference start notice indicating the initiation of video conference to the client unit 20 of the same electronic whiteboard 2c, at the timing when the electronic whiteboard 2c starts communicating with the transmission terminal 8 (step S80). In cases when the transmission of contents of data starts according to operation or input made by a user to start a video conference after the communication between the electronic whiteboard 2c and the transmission terminal 8 is established, the communication controller 81 of the electronic whiteboard 2c may send a video-conference start notice to the client unit 20 of the same electronic whiteboard 2c at the timing when the contents of data are transmitted through the communication with the transmission terminal 8. The communication controller 21 of the client unit 20 in the electronic whiteboard 2c receives the video-conference start notice sent from the client unit 80 as an event. Note that this received event indicates a signal that is sent by operation other than the operation of the communication application A11.

When the video-conference start notice is received by the communication controller 21 of the electronic whiteboard 2c, the image management unit 22Z changes the default frame rate of the moving images that are output from the electronic whiteboard 2c to a different frame rate (step S81). The processes in the step S81 are described with reference to FIG. 12.

Figure 12:
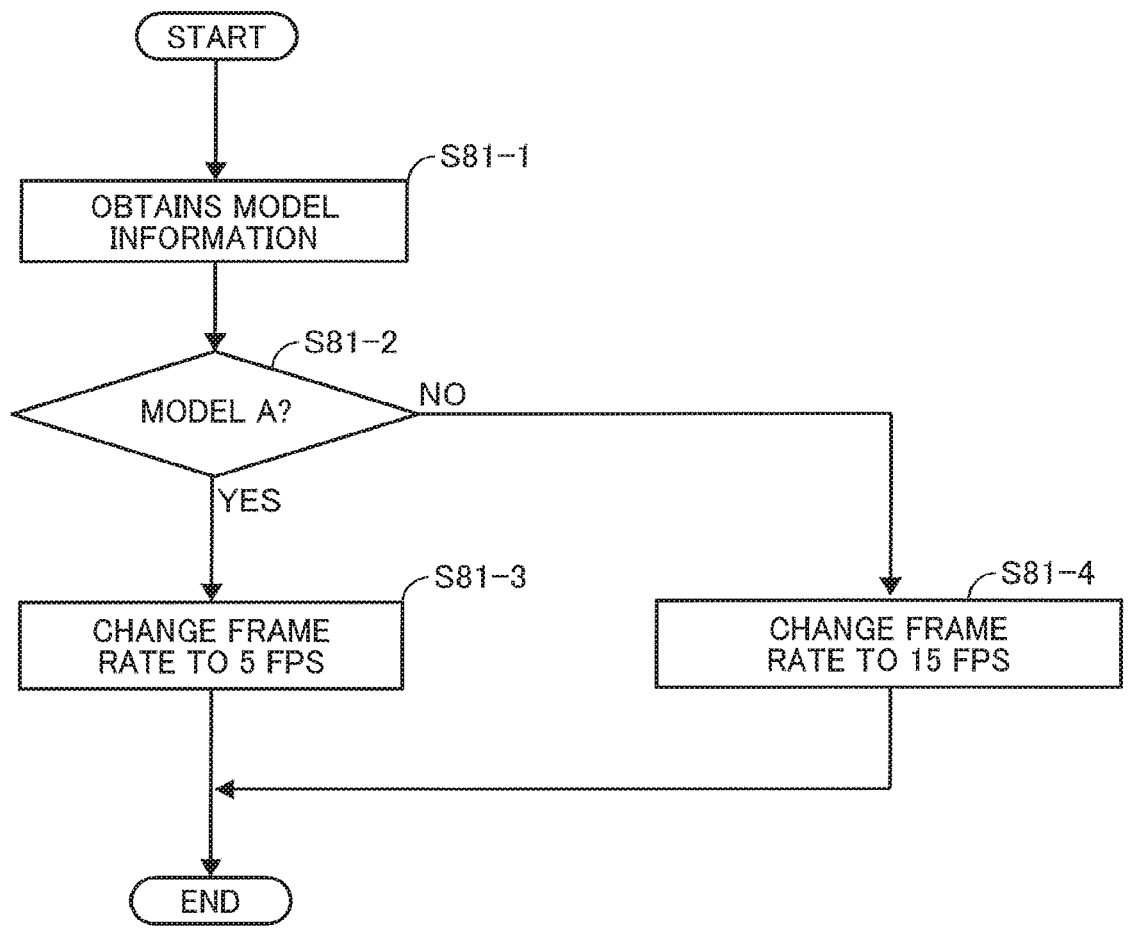
FIG. 12 is a flowchart of the processes of changing the frame rate of moving images, according to an embodiment of the present disclosure.

FIG. 12 is a flowchart of the processes of changing the frame rate of moving images, according to the present embodiment.

The memory 2000 of the electronic whiteboard 2c stores the model information that indicates the model of the device itself. The image management unit 22Z of the electronic whiteboard 2c stored in the memory 2000, obtains the model information that indicates the model of the device itself (step S81-1).

In the present embodiment, the model with relatively low processing speed among the electronic whiteboards 2 that are installable with the communication application A11 is referred to as "MODEL A." The image management unit 22Z of the electronic whiteboard 2c determines whether the model information obtained in the step S81-1 indicates "MODEL A" (step S81-2).

When it is determined in the step S81-2 that the model information indicates "MODEL A" ("YES" in the step S81-2), the image management unit 22Z of the electronic whiteboard 2c changes the frame rate of the moving images, which are output from the electronic whiteboard 2c, to 5 frames per second (fps) (step S81-3). When it is determined in the step S81-2 that the model information does not indicate "MODEL A" ("NO" in the step S81-2), the image management unit 22Z of the electronic whiteboard 2c changes the frame rate of the moving images, which are output from the electronic whiteboard 2c, to 15 fps (step S81-4). Next, cases in which the frame rate is changed to 15 fps in the step S81-4 are described.

The image management unit 22Z of the electronic whiteboard 2c converts the frame rate of the moving images of 60 fps generated by the input unit 22B to the frame rate 15 fps modified in the step S81-4. Due to these processes as described above, every time four moving-image frames are generated by the input unit 22B, the image management unit 22Z controls the superimposition unit 22Y to output one moving-image frame as the fourth layer of external image (step S72-5, step S72-9). Moreover, the image management unit 22Z determines not to output the remaining three moving-image frames among the four moving-image frames (step S72-6, step S72-7, step S72-8).

The superimposition unit 22Y of the electronic whiteboard 2c outputs a superimposed image where a layer of the background image, a layer of the external image including the moving-image frame specified by the image management unit 22Z, a layer of the object images, a layer of the stroke images, and a layer of the UI images are superimposed on top of one another in the order listed (step S73-5, step S73-9). The display order of the superimposed image that is output in the step S73-5 and the step S73-9 is controlled by the display controller 82, as will be described later in detail, and then is output to the display 3c.

Next, cases in which the client unit 80 terminates the communication with the transmission terminal 8 after a moving-image frame is generated in the step S71-9 are described. The client unit 80 of the electronic whiteboard 2c sends a video-conference end notice indicating the termination of video conference to the client unit 20 at the timing when the communication with the transmission terminal 8 is terminated (step S82). When the communication between the electronic whiteboard 2c and the transmission terminal 8 is terminated according to operation or input made by a user after the exchanging of the contents of data between the electronic whiteboard 2c and the transmission terminal 8 is terminated, the communication controller 81 of the electronic whiteboard 2c may send a video-conference end notice to the client unit 20 of the same electronic whiteboard 2c at the timing when the exchanging of the contents of data is terminated. The communication controller 21 of the client unit 20 in the electronic whiteboard 2c receives the video-conference end notice sent from the client unit 80 as an event.

When the video-conference end notice is received by the communication controller 21 of the electronic whiteboard 2c, the image management unit 22Z changes the frame rate of the moving images, which are output from the electronic whiteboard 2c, to the default frame rate (step S83). The following processes are equivalent to the processes after the step S71-1, and thus their description is omitted.

<Generation of Image by Communication Application B11>

Next, the processes of generating an image based on the video data exchanged between the electronic whiteboard 2c and the transmission terminal 8 are described with reference to FIG. 13.

Figure 13:
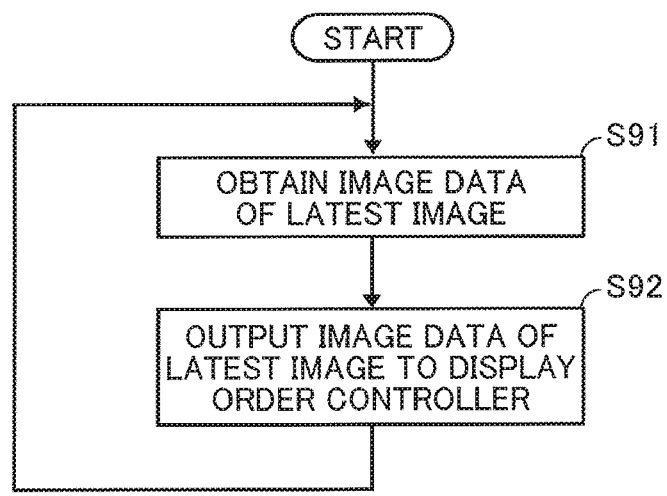
FIG. 13 is a flowchart of the processes of generating an image, according to an embodiment of the present disclosure.

FIG. 13 is a flowchart of the processes of generating an image using the communication application B11, according to the present embodiment.

In the following description, the processes of generating an image using the communication application B11 of the electronic whiteboard 2c are described.

The display controller 82 of the electronic whiteboard 2 obtains the image data of the latest image (see step S48) stored in the memory 2000 (step S91). Note that the image data of an updated image indicates the image data of the latest moving-image frame in the video data received by the electronic whiteboard 2c from the transmission terminal 8.

The display controller 82 of the electronic whiteboard 2 outputs the image data of an updated image obtained in the step S91 to the display order controller 24 (step S92). The display order of the image that is output in the step S92 is controlled by the display controller 82, as will be described later in detail, and then is output to the display 3c.

While the communication application B11 is operating, the client unit 80 of the electronic whiteboard 2c repeats the processes in the step S91 and the step S92. Accordingly, the latest moving-image frames that together configure the moving images of the video conference are repeatedly output to the display order controller 24.

The display order controller 24 of the electronic whiteboard 2c controls, according to operation made by a user, the images output from the client unit 20 and the images output from the client unit 80 such that the images output from the client unit 20 are activated and the images output from the client unit 80 are deactivated or such that the images output from the client unit 20 are deactivated and the images output from the client unit 80 are activated. Due to these processes, the display order controller 24 controls the images output from the client unit 20 and the images output from the client unit 80 such that the images output from the client unit 20 are displayed in the foreground of the screen of the display 3c or such that the images output from the client unit 80 are displayed in the foreground of the screen of the display 3c. Accordingly, a superimposed image that is output from the communication application A11 or the moving images of video conference that are output from the communication application B11 are actively output onto the display 3c of the electronic whiteboard 2c.

<<Modification of Example Embodiment>>

Next, a modification of the embodiments of the present disclosure is described. In particular, differences in configuration from the embodiments as described above are described. In such a modification of the embodiments, the communication controller 81 of the electronic whiteboard 2c sends a request to start a phone conversation to the management system 50 (step S42). In other words, in the present modification of the embodiments, the timing at which the communication application B11 of the electronic whiteboard 2c is activated matches the timing at which the communication between the electronic whiteboard 2c and the transmission terminal 8 starts.

An OS 2020 of the electronic whiteboard 2c manages the state of the communication application BI 1. When the communication application B11 starts operating, the OS 2020 of the electronic whiteboard 2c transmits the data indicating that the communication application B11 is operating to the client unit 20, as the data corresponding to the video-conference start notice transmitted in the step S80.

The communication controller 21 of the client unit 20 in the electronic whiteboard 2c receives the data indicating that the communication application B11 is operating. Subsequently, in a similar manner to the step S81, the image management unit 22Z of the electronic whiteboard 2c changes the frame rate of the moving images to be output. The following processes are equivalent to those of the embodiments as described above, and thus their description is omitted.

Moreover, once the communication with the communication application B11 of the transmission terminal 8 is terminated, the communication application B11 of the electronic whiteboard 2c stops operating. In other words, the timing at which the operation of the communication application B11 in the electronic whiteboard 2c is terminated, matches the timing at which the communication between the electronic whiteboard 2c and the transmission terminal 8 is terminated.

When the communication application B11 stops operating, the OS 2020 of the electronic whiteboard 2c transmits the data indicating that the communication application BI 1 is not operating to the client unit 20, as the data corresponding to the video-conference end notice transmitted in the step S82.

The communication controller 21 of the client unit 20 in the electronic whiteboard 2c receives the data indicating that the communication application B11 is not operating. Subsequently, in a similar manner to the step S83, the image management unit 22Z of the electronic whiteboard 2c changes the to-be-output frame rate of the moving images to the default frame rate. The following processes are equivalent to those of the embodiments as described above, and thus their description is omitted.

With the moving-image output method according to the embodiments described above, the electronic whiteboard 2 (an example of a communication terminal) processes the moving images that are received through the communication with an external communication terminal and the moving images that are input from an external device. The communication controller 21 (an example of a receiver) of the electronic whiteboard 2 receives (an example of receiving processes) a video-conference start notice (an example of event related to the initiation of communication with the transmission terminal 8 (an example of an external communication terminal)). The input unit 22B (an example of an input unit) of the electronic whiteboard 2 inputs (an example of inputting processes) the external images (an example of moving images) output by the laptop PC 6 (an example of an external device). The image management unit 22Z (an example of an output unit) of the electronic whiteboard 2 the moving images input through the input unit 22B outputs (an example of outputting processes) to the display 3 (an example of a display). Once the communication controller 21 receives the video-conference start notice, the image management units 22Z of the electronic whiteboard 2 reduces the frame rate of the moving images to be output to the display 3. Accordingly, the load that is caused by starting communication with the transmission terminal 8 in the electronic whiteboard 2 can be reduced by changing the frame rate of the external images, and thus errors in which the output of the external images is interrupted or terminated due to overloaded can be reduced.

The video-conference start notice as mentioned above may be data that indicates the initiation of exchanging contents of data such as video data and audio data with the transmission terminal 8. Due to this configuration, even if there is a time-lag in the electronic whiteboard 2 between the instant when the communication with the transmission terminal 8 started and the instance when the transmission of contents of data starts, the image management unit 22Z may be controlled to change the frame rate of the external images at the timing when the transmission of contents of data starts.

According to the embodiments described above, the communication controller 21 of the electronic whiteboard 2 receives a video-conference start notice that is sent by the operation of the communication application B11, which is performed to start communication with the transmission terminal 8. As the communication application B11 performs processes to establish a communication, the communication application B11 can transmit a video-conference start notice to the communication application A11 at a precise timing when the transmission of contents of data starts.

In such a modification of the embodiments, the communication controller 21 of the electronic whiteboard 2 receives, as an event related to the initiation of communication, the data indicating the initiation of the communication application B11 that is used for communicating with the transmission terminal 8. Due to this configuration, when the timings of the initiation of the communication application B11 matches the timing at which the communication application B11 starts communication, the image management unit 22Z can change the frame rate of the external images at the timing when the communication starts, based on the data indicating the initiation of the communication application B11.

The communication controller 21 of the electronic whiteboard 2 receives an event (an example of event related to the initiation of communication with the transmission terminal 8) that is sent by the operation of the OS 2020 (an example of basic software) that controls the communication application B11 that is used to communicate with the transmission terminal 8. When the communication application B11 has no function to send an event to the communication application A11, the communication application A11 can still receive the event.

The image management units 22Z of the electronic whiteboard 2 (an example of an acquisition unit) obtains the model information of the electronic whiteboard 2. Once the communication controller 21 receives the video-conference start notice, the image management units 22Z of the electronic whiteboard 2 changes the frame rate of the external images to the frame rate corresponding to the model information. Due to this configuration, the communication application A11 that is installed when a plurality of kinds of models are installable with the communication application A11 can change the frame rate of the external images according to the capability of the device itself.

The communication controller 21 of the electronic whiteboard 2 receives a video-conference end notice (an example of event related to the termination of communication with the transmission terminal 8). Once the communication controller 21 receives the video-conference end notice, the image management units 22Z of the electronic whiteboard 2 increases the frame rate of the external images to be output to the display 3. Due to this configuration, high-quality external images can be output after the communication is terminated.

The communication applications A11 and B11 may be recorded on a computer-readable recording medium for distribution in an installable or executable file format. Examples of such a recording medium include, but not limited to, a compact disc-recordable (CD-R), a digital versatile disc (DVD), and a Blu-ray disc. Moreover, a memory storing any one of the above-described control programs, such as a recording medium including a CD-ROM or a HDD, may be provided in the form of a program product to users within a certain country or outside that country.

Any one of the electronic whiteboard 2, the transmission terminal 8, the relay device 30, and the management system 50 according to the embodiments described above may be implemented by a single apparatus or a plurality of apparatuses to which divided elements (functions or units) are allocated.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The term "processing circuit" herein includes, for example, a device such as a processor that may be provided with an electronic circuit and is programmed to execute software to implement functions, an application specific integrated circuit (ASIC) that is designed to execute the above functions, and a conventional circuit module.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored on any kind of storage medium. Examples of storage media include, but are not limited to, flexible disks, hard disks, optical discs, magneto-optical discs, magnetic tape, nonvolatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. A communication terminal, comprising:
   circuitry configured to
      receive an event related to an initiation of a communication session with a counterpart communication terminal,
      input video output by an external device, other than the counterpart communication terminal, and
      output the video to a display at a first frame rate, prior to receiving the event,
   wherein in response to the circuitry receiving the event related to the initiation of the communication session, the circuitry is configured to reduce an output frame rate of the input video to be output to the display from the first frame rate to a second frame rate that is less than the first frame rate.

2. The communication terminal according to claim 1, wherein the event related to the initiation of the communication session includes data indicating an initiation of exchanging of content with the counterpart communication terminal.

3. The communication terminal according to claim 2, wherein the event received by the circuitry is sent by operation of an application used to communicate with the counterpart communication terminal.

4. The communication terminal according to claim 1, wherein the event related to the initiation of the communication session includes data indicating an initiation of an application used to communicate with the counterpart communication terminal.

5. The communication terminal according to claim 4, wherein the event received by the circuitry is sent by operation of software configured to control the application used to communicate with the counterpart communication terminal.

6. The communication terminal according to claim 1, wherein the circuitry is further configured to
   obtain model information of the communication terminal after the circuitry receives the event related to the initiation of the communication session, and
   change the output frame rate of the video to be output to the display to the second frame rate, which corresponds to the obtained model information.

7. The communication terminal according to claim 1, wherein
the circuitry is further configured to receive an event related to a termination of the communication session with the counterpart communication terminal, and
in response to the circuitry receiving the event related to the termination of the communication session, the circuitry increases the output frame rate of the video to be output to the display.

8. A communication system comprising:
the communication terminal according to claim 1; and
the counterpart communication terminal.

9. The communication terminal of claim 1, wherein the circuitry is further configured to display a superimposed image including a background image, a user interface image, a stroke image, and the video input from the external device.

10. A method of outputting video from a communication terminal, the method comprising:
receiving an event related to an initiation of a communication session with a counterpart communication terminal;
inputting video output by an external device, other than the counterpart communication terminal; and
outputting the video input in the inputting step to a display at a first frame rate, prior to receiving the event,
wherein in response to the event related to the initiation of the communication session being received, the outputting step includes reducing an output frame rate of the input video to be output to the display from the first frame rate to a second frame rate that is less than the first frame rate.

11. The method according to claim 10, wherein the event related to the initiation of the communication session includes data indicating an initiation of exchanging of content with the counterpart communication terminal.

12. The method according to claim 11, wherein the event which has been received is sent by operation of an application used to communicate with the counterpart communication terminal.

13. The method according to claim 10, wherein the event related to the initiation of the communication session includes data indicating an initiation of an application used to communicate with the counterpart communication terminal.

14. The method according to claim 13, wherein the event which has been received is sent by operation of software configured to control the application used to communicate with the counterpart communication terminal.

15. The method according to claim 10, further comprising:
obtaining model information of the communication terminal after receiving the event related to the initiation of the communication session, and
changing the output frame rate of the video to be output to the display to the second frame rate, which corresponds to the obtained model information.

16. The method according to claim 10, further comprising:
receiving an event related to a termination of the communication session with the counterpart communication terminal; and
in response to receiving the event related to the termination of the communication session, increasing the output frame rate of the video to be output to the display.

17. The method of claim 10, further comprising:
displaying a superimposed image including a background image, a user interface image, a stroke image, and the video input from the external device.

18. A non-transitory computer-readable recording medium storing a program for causing a computer to execute a method, the method comprising:
receiving an event related to an initiation of a communication session with a counterpart communication terminal;
inputting video output by an external device, other than the counterpart communication terminal; and
outputting the video input in the inputting step to a display at a first frame rate, prior to receiving the event,
wherein in response to the event related to the initiation of the communication session being received, the outputting step includes reducing an output frame rate of the input video to be output to the display from the first frame rate to a second frame rate that is less than the first frame rate.

19. The non-transitory computer-readable recording medium according to claim 18, wherein the event related to the initiation of the communication session includes data indicating an initiation of exchanging of content with the counterpart communication terminal.

20. The non-transitory computer-readable recording medium according to claim 18, further storing instructions to execute:
obtaining model information of the communication terminal after receiving the event related to the initiation of the communication session, and
changing the output frame rate of the video to be output to the display to the second frame rate, which corresponds to the obtained model information.

* * * * *